United States Patent
Okishiro et al.

(10) Patent No.: US 8,183,758 B2
(45) Date of Patent: May 22, 2012

(54) LIQUID CRYSTAL DISPLAY DEVICE WITH THE MIXTURE OF THE PLURAL KINDS OF GREEN PHOSPHORS

(75) Inventors: Kenji Okishiro, Kodaira (JP); Shin Imamura, Kokubunji (JP); Masatoshi Shiiki, Musashimurayama (JP)

(73) Assignees: Hitachi Displays, Ltd., Chiba (JP); Panasonic Liquid Crystal Display Co., Ltd., Hyogo-ken (JP)

( * ) Notice: Subject to any disclaimer, the term of this patent is extended or adjusted under 35 U.S.C. 154(b) by 1616 days.

(21) Appl. No.: 11/154,804

(22) Filed: Jun. 17, 2005

(65) Prior Publication Data

US 2006/0033860 A1    Feb. 16, 2006

(30) Foreign Application Priority Data

Jun. 23, 2004    (JP) ................................. 2004-184383

(51) Int. Cl.
*H01L 33/00* (2010.01)
*H01L 21/00* (2006.01)

(52) U.S. Cl. ... 313/486; 313/467; 313/581; 252/301.4 R

(58) Field of Classification Search .......... 313/446–447; 252/301.4 R

See application file for complete search history.

(56) References Cited

U.S. PATENT DOCUMENTS

| | | | | |
|---|---|---|---|---|
| 3,417,027 A | * | 12/1968 | Wanmaker et al. | 252/301.4 R |
| 5,714,836 A | * | 2/1998 | Hunt et al. | 313/487 |
| 6,495,068 B1 | * | 12/2002 | Park et al. | 252/301.4 R |
| 6,947,130 B2 | * | 9/2005 | Mukai et al. | 356/121 |
| 2002/0033909 A1 | | 3/2002 | Hiyama | |
| 2002/0060759 A1 | | 5/2002 | Kim | |
| 2002/0063511 A1 | * | 5/2002 | Imamura et al. | 313/486 |
| 2003/0094889 A1 | | 5/2003 | Imamura | |

(Continued)

FOREIGN PATENT DOCUMENTS

CN    1338769    3/2002

(Continued)

OTHER PUBLICATIONS

Taiichiro Kurita, "Journal of the Institute of Electronics, Information and Communication Engineers", EID99-10, pp. 55-60, Jun. 1999.

*Primary Examiner* — Tracie Y Green
(74) *Attorney, Agent, or Firm* — Antonelli, Terry, Stout & Kraus, LLP.

(57) ABSTRACT

An object of the present invention is to provide a moving picture displayable liquid crystal display device capable of attaining satisfactory moving picture characteristics, color reproducibility and reliability at the same time. A liquid crystal display device according to the present invention comprises a white light source having a blue phosphor, a green phosphor, and a red phosphor and having a light-on state and a light-off state in a single frame; and a liquid crystal display panel which controls an amount of transmitted light from the white light source for each pixel, and which has a color filter for allowing one of blue light, green light, and red light to be transmitted therethrough for each pixel, in which at least one type of the blue color phosphor, green color phosphor, and red color phosphor is a phosphor mixture composed of at least two phosphors having different host material composition, and phosphors having a luminescence center of the same element are used for the phosphor mixture of the same color.

30 Claims, 20 Drawing Sheets

U.S. PATENT DOCUMENTS

| | | |
|---|---|---|
| 2004/0047141 A1 | 3/2004 | An |
| 2004/0208281 A1 | 10/2004 | Noji |
| 2005/0046331 A1* | 3/2005 | Kim et al. .................... 313/493 |
| 2005/0110923 A1 | 5/2005 | Yamashita |
| 2005/0199897 A1* | 9/2005 | Setlur et al. .................... 257/98 |

FOREIGN PATENT DOCUMENTS

| | | |
|---|---|---|
| JP | 8-190894 | 7/1996 |
| JP | 8-209121 | 8/1996 |
| JP | 10-49073 | 2/1998 |
| JP | 11-109893 | 4/1999 |
| JP | 2001-351578 | 12/2001 |
| JP | 2002-049037 | 2/2002 |
| JP | 2002-105447 | 4/2002 |
| JP | 2002-313282 | 10/2002 |
| JP | 2003-98337 | 4/2003 |
| JP | 2003-155481 | 5/2003 |
| JP | 2004-51931 | 2/2004 |
| JP | 2004-87489 | 3/2004 |
| WO | WO 03/083890 | 10/2003 |

* cited by examiner

FIG.4
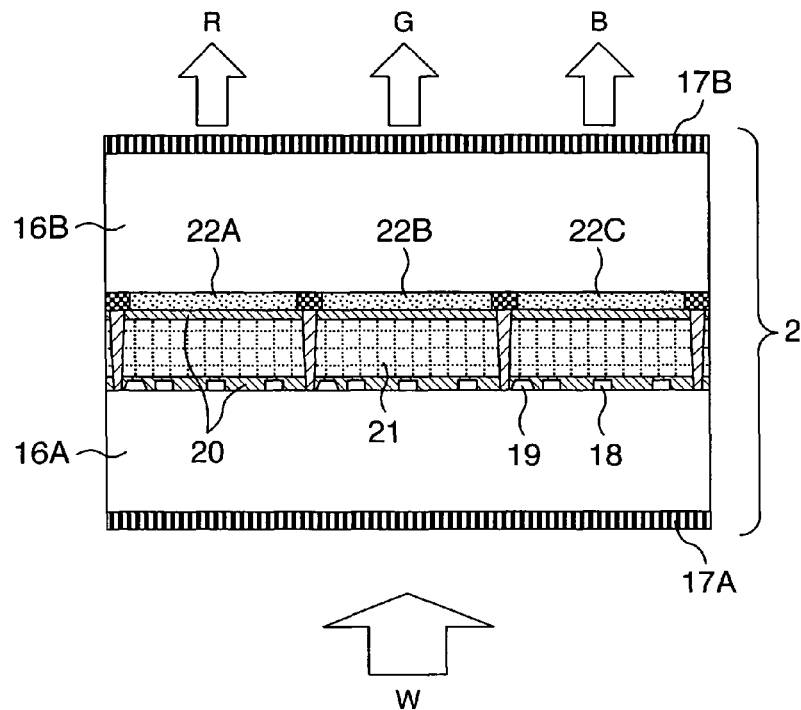
FIG.5(a) TIMING SIGNAL $V_{sig}$
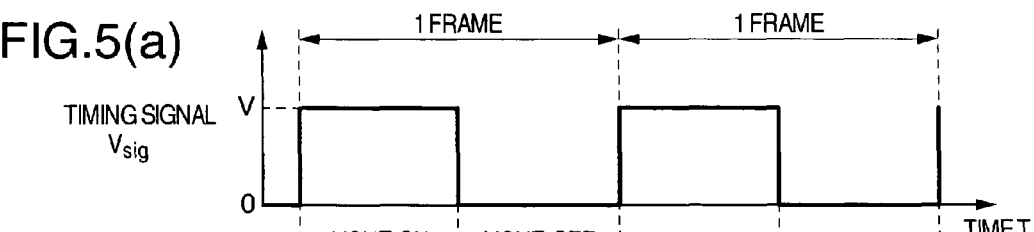
FIG.5(b) BRIGHTNESS OF IDEAL LIGHT SOURCE
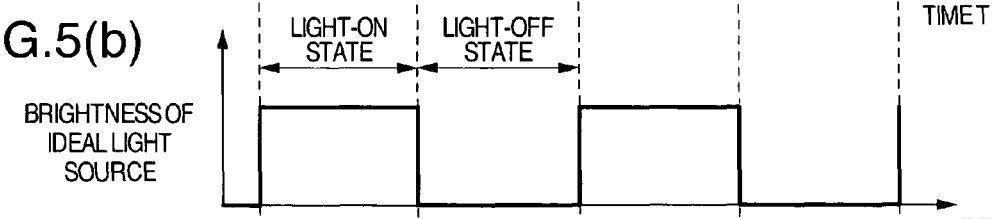
FIG.5(c) BRIGHTNESS OF CCFL
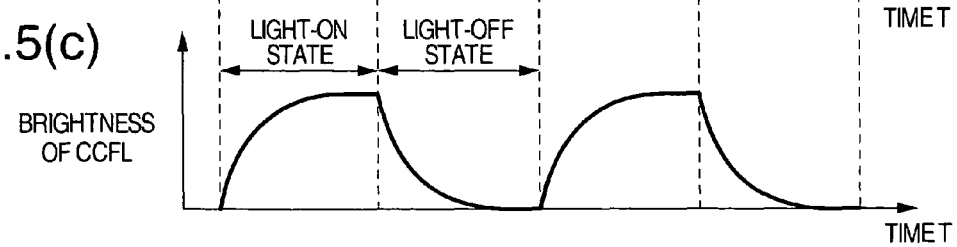

LIQUID CRYSTAL DISPLAY DEVICE WITH THE MIXTURE OF THE PLURAL KINDS OF GREEN PHOSPHORS

INCORPORATION BY REFERENCE

The present application claims priority from Japanese application JP 2004 1843283 filed on Jun. 23, 2004, the content of which is hereby incorporated by reference into this application.

BACKGROUND OF THE INVENTION

The present invention relates to a white light source having a phosphor mixture provided therein and a liquid crystal display device using the same.

The liquid crystal display device is constituted of a back light unit 1 and a liquid crystal display panel 2, as shown in FIG. 2. The back light unit is further composed of a white light source (cold cathode fluorescent lamp 5 in FIG. 2), an inverter 9 for driving the white light source, a reflector 4, a metal case 3, a diffuser plate 6, prism sheets 7 (7A, 7B) and a reflective polarizer 8.

As the white light source used in the liquid crystal display device, a three band-type cold cathode fluorescent lamp (CCFL) 5 is generally used. The structure of the CCFL is as shown in FIG. 3(a), which shows a sectional view taken along a line parallel to the longitudinal direction of the CCFL. As shown in the figure, the CCFL has a glass tube 11 enclosing mercury gas and a rare gas, phosphor 12 applied onto the inner wall of the glass tube, and electrodes 13 at both ends. The phosphor is a mixture of phosphor powders consisting of a blue phosphor emitting blue light (a main peak wavelength of emission light is about 400 to 500 nm), a green phosphor emitting green light (a main peak wavelength of emission light is about 500 to 600 nm) and a red phosphor emitting red light (a main peak wavelength of emission light is about 600 to 650 nm). One type of phosphor is used per color. Generally, use is made of $BaMgAl_{10}O_{17}$:Eu as a blue color phosphor, $LaPO_4$:Tb as a green color phosphor, and $Y_2O_3$:Eu as a red color phosphor. Note that the former part from the symbol ":" represents a composition of a host material. The latter part from the symbol ":" represents a luminescence center which replaces for a part of the atoms of the host materials. To explain more specifically, in the green phosphor, $LaPO_4$ represents a host material and lanthanum (La) is partially replaced with a luminescence center, terbium (Tb). The CCFL is illuminated by applying voltage to the electrodes 13. When the voltage is applied, mercury atoms are excited within the tube, emitting ultraviolet light. The phosphors are then excited by the ultraviolet light, emitting visible rays. The beam of the visible rays thus emitted passes through the diffuser plate provided immediately upon the CCFL, the prism sheets, and the reflective polarizer, and then enters the liquid crystal display panel. Furthermore, the reflector is arranged to guide light emitted from the CCFL toward the liquid crystal display panel as much as possible.

On the other hand, the liquid crystal display panel has a sectional structure shown in FIG. 4. More specifically, a pair of polarizers 17 and substrates 16 (e.g., glass) are arranged, and liquid crystal 21 and a color filter 22 are sandwiched between the substrates. The liquid crystal are uniformly aligned by the presence of an alignment layer 20 and driven by applying voltage to an electrode group consisting of a plurality of electrodes 18 and formed for each pixel. When voltage is applied to the liquid crystal, liquid crystal molecules are rotated; with the result that refractive index of the crystal changes. In this way, the amount of transmitted light from the back light unit can be controlled. Furthermore, white light W from the back light unit is spectrally separated by color filters into color components, blue light B, green light G and red light R for each pixel and each color filter passes one of the light components therethrough. The liquid crystal display device performs color display by controlling the transmission amount of the light from the back light unit (white light source) for each pixel, thereby dividing the light into light components.

Recently, such a liquid crystal display device has been developed as a device displaying not only a non-moving picture but also a moving picture as in a liquid crystal television. In the development, it has been pointed out that the image of a moving picture looks blurred (referred to as "blurred image") due to quality deterioration of an image. The blurred image is caused by a hold-type display employed by the liquid crystal display device. To improve this problem, a blink back light system has been proposed (for example, in "Image Quality of Moving Picture in Hold-type Display Device", Journal of the Institute of Electronics, Information and Communication Engineers, EID99-10, p 55).

The blink back light system is one that light-on and light-off states of a light source are repeated in a single frame (60 Hz is employed in a general liquid crystal display device), as shown in FIG. 5. Usually, the light-on and light-off states are controlled by a timing signal $V_{sig}$ sent from a circuit integrated in an inverter (FIG. 5(a)). In an ideal light source, brightness varies in the same fashion as the timing signal $V_{sig}$ changes (FIG. 5(b)). However, actually in a CCFL, the brightness does not sufficiently go along with the change of the timing signal $V_{sig}$ and follows with a time lag (FIG. 5(c)). This system is greatly expected as a technique for improving the performance of a moving picture in future. If the response characteristics of the CCFL presently in use can be further improved, the performance of a moving picture of a liquid crystal display device can be further improved.

Such a response delay in a CCFL is conceivably caused by delay of an inverter circuit supplying power to the CCFL, response of ultraviolet light generated within the CCFL, and response of phosphors. Of them, the largest rate-determining element is brightness response of a green phosphor. Table 1 summarizes response characteristic evaluation results of phosphor materials presently used in a CCFL. In the table, the brightness response time is defined as the time required until each phosphor material attains 90% brightness based on the largest brightness as being 100%. To explain more specifically, the 90% brightness rise time $\tau_{on}$ is one required for the brightness to rise from 0% to 90%. The 10% brightness fall time $\tau_{off}$ is one required for the brightness to fall from 100% to 10%. As is apparent from the results, the response of a green phosphor, $LaPO_4$:Tb, Ce is particularly slow compared to blue and red phosphors. For example, when a CCFL is illuminated by the half time (Duty 50%) of 1 frame (16.7 msec in the case of 60 Hz), the CCFL cannot go along with a timing signal. Before the brightness of the CCFL completely rises (before the brightness reaches 100%), light-out time ($V_{sig}$=0) comes, conversely, before the brightness decreases (before the brightness reaches 0%), light-on time comes ($V_{sig}$=V). Therefore, to further improve the quality of a moving picture, it is necessary to attain a high-speed response of a CCFL, that is, a high-speed response of a green phosphor. In addition, a high-speed response of a red phosphor is also desired.

TABLE 1

Brightness response time of phosphor material

| Color | Phosphor material | $\tau_{on}$[msec] | $\tau_{off}$[msec] |
|---|---|---|---|
| Blue | $BaMgAl_{10}O_{17}$:Eu | <0.1 | <0.1 |
| Green | $LaPO_4$:Tb,Ce | 4.7 | 5.8 |
| Red | $Y_2O_3$:Eu | 1.8 | 1.8 |

Recently, as a green phosphor material capable of responding at a high speed to possibly overcome this problem, $SrAl_2O_4$:Eu is drawn attention. For example, use of such a green phosphor material has been proposed in the following patent documents:

(1) JP-A-8-190894
(2) JP-A-10-49073
(3) JP-A-11-109893
(4) JP-A-2002-313282
(5) JP-A-2001-351578
(6) JP-A-2002-105447

In these documents, high-speed response of a CCFL is attained by using $SrAl_2O_4$:Eu alone or in combination with a green color phosphor, $LaPO_4$:Tb, Ce presently in use. When the response characteristics of $SrAl_2O_4$:Eu is actually evaluated, both $\tau_{on}$, and $\tau_{off}$ exhibit less than 0.1 msec. Thus, quite quick brightness response characteristics can be obtained.

However, in applying $SrAl_2O_4$:Eu to a CCFL, there are the flowing two big problems. As a result of studies conducted by the present inventors, it is difficult to use $SrAl_2O_4$:Eu in practice.

A first problem is a reduction of color reproducibility, more specifically, it is primarily due to a reduction of blue chromaticity. A second problem is a decrease of reliability (brightness deterioration).

The first problem of a reduction of color reproducibility will be explained with reference to FIG. 6. FIG. 6(a) shows emission spectrum of $LaPO_4$:Tb, Ce and $SrAl_2O_4$:Eu and spectroscopic characteristics (B_CF, G_CF, R_CF) of a color filter. As is apparent form the figure, the emission spectrum of $SrAl_2O_4$:Eu exhibits a very broad profile having a half-band width of about 80 nm with a peak in the vicinity of a wavelength of 520 nm. Since the spectroscopic characteristic of a blue color filter is not sharp, the light of main emission wavelength region of $SrAl_2O_4$:Eu can pass through a blue pixel, with the result that the colorimetric purity of blue greatly decreases compared to $LaPO_4$:Tb, Ce, presently in use. The color gamuts of liquid crystal display devices actually using $LaPO_4$:Tb, Ce as a green phosphor and $SrAl_2O_4$:Eu are shown in FIG. 6(b). It is found that a chromaticity point v' of blue is increased by use of $SrAl_2O_4$:Eu and shifts toward a green side from the blue chromaticity point defined by NTSC. The human vision is said to be sensible enough to recognize a change of $\Delta(u,v)=0.2$ or more, so that such a shift of blue chromaticity is a significant problem. Furthermore, in the case of JP-A-2002-3132828 proposing use of a mixture of $LaPO_4$:Tb, Ce and $SrAl_2O_4$: Eu, it is readily conceivable that a calorimetric purity of blue may decrease by increasing the mixing ratio of $SrAl_2O_4$:Eu. To overcome such a decrease of calorimetric purity, it is conceivable that the spectroscopic characteristic of the color filter is made sharp. However, since the color filter is formed of a mixture of a dye and a pigment in order to impart both light resistance and light transmissibity, the profile of spectroscopic characteristics inevitably becomes broad. Therefore, to suppress the colorimetric purity from decreasing, control is desirably made by the emission spectrum of a green phosphor.

The second problem is the reliability of $SrAl_2O_4$:Eu. When heat of about 100° C. is applied to this material in an ambient atmosphere containing water or a high-humid ambient atmosphere, the crystal structure of a host material thereof changes, with the result that the brightness significantly decreases. In short, the brightness significantly deteriorates by a CCFL manufacturing process compared to a powdery state at the starting time. In addition, this material has a feature in that it easily absorbs mercury. The material absorbs mercury gas enclosed in a CCFL tube and decreases luminescence efficiency of ultraviolet light. A liquid crystal display device formed of such a chemically labile material cannot ensure the reliability.

As a back light technique for a future liquid crystal TV, the blink system is expected. However, a green phosphor material $LaPO_4$:Tb, Ce presently in use has a problem in response characteristics, whereas $SrAl_2O_4$:Eu has big problems in color reproducibility and reliability. In short, a liquid crystal display device satisfying all three characteristics: moving picture characteristics (in particular, CCFL response characteristics), color reproducibility and reliability cannot be obtained by use of conventional techniques.

Hence, an object of the present invention is to provide a moving picture displayable liquid crystal display device capable of attaining satisfactory moving picture characteristic, color reproducibility and reliability at the same time.

SUMMARY OF THE INVENTION

An object of the present invention is to provide a liquid crystal display device, such as a liquid crystal TV, for displaying a moving picture in which no blurred image is produced. More particularly, in a moving picture displayable liquid crystal display device, to improve the response of a green phosphor used in a white light source, thereby attaining satisfactory moving picture characteristics, color reproducibility and reliability, simultaneously, the present invention employs the following means. Furthermore, the present invention improves the response of a red phosphor by the following means, thereby attaining satisfactory high-speed response, color reproducibility and reliability at the same time.

As a first means, there is provided a liquid crystal display device comprising a white light source having a blue phosphor emitting blue light, a green phosphor emitting green light, and a red phosphor emitting red light and having a light-on state and a light-off state in a single frame; and a liquid crystal display panel which controls the amount of transmitted light from the white light source for each pixel, and which has a color filter for allowing one of blue light, green light, and red light to be transmitted therethrough for each pixel, in which at least one of the blue color phosphor, the green color phosphor, and the red color phosphor is a phosphor mixture composed of at least two phosphors having different host material compositions, and the phosphors used in the mixture have a luminescence center of the same element.

In addition to the first means, the green phosphor may be the green phosphor mixture, and the phosphors used in the mixture may have a luminescence center of Terbium (Tb).

Furthermore, the green phosphor may be a green phosphor mixture composed of at least two phosphors having different material compositions, and the phosphors used in the mixture may have a peak wavelength within the range of 545±15 nm.

On the other hand, at least one of red phosphors may be a red phosphor mixture composed of at least two phosphors having different host material compositions, and the phosphors used in the mixture may have a luminescence center of europium (Eu).

Furthermore, the following constitution is acceptable. The red phosphor may be a red phosphor mixture composed of at least two phosphors having different material compositions and, the phosphors used in the mixture may have a peak wavelength within the range of 615±15 nm.

As to the blue phosphor, the following constitution is preferable.

The blue phosphor may be a blue phosphor mixture composed of at least two phosphors having different material compositions, and the phosphors used in the mixture may have a peak wavelength within the range of 450±15 nm.

Moreover, in addition to the basic constitutions mentioned above, the blue phosphor, the green phosphor, and the red phosphor each desirably have a response time within the following range.

The sum of a 90% brightness rise time from a light-off state to a light-on state and a 10% brightness fall time from a light-on state to a light-off state falls within a single frame of time.

The 90% brightness rise time from a light-off state to a light-on state and the 10% brightness fall time from the light-on state to a light-off state each fall within the half of a single frame of time, respectively.

The 90% brightness rise time from a light-off state to a light-on state and the 10% brightness fall time from a light-on state to a light-off state are each 4 msec or less, respectively.

Furthermore, the 90% brightness rise time from a light-off state to a light-on state and the 10% brightness fall time from a light-on state to a light-off state are desirably 3 msec or less, respectively.

Moreover, as a host material for the green phosphor material to be used in the constitution of the invention, a phosphor material having the following composition is desirable.

At least one type of the green phosphors composing the green phosphor mixture desirably has a host material of a silicate containing silicon (Si) and oxygen (O), more desirably, a silicate represented by a chemical formula $Ln_xSi_yO_z$ (Ln=La, Y, Gd, Ga), and more specifically, a phosphor material represented by a chemical formula $Ln_2SiO_5$ or $Ln_2Si_2O_7$ (Ln=La, Y, Gd)

Alternatively, a phosphor material represented by a chemical formula: $(Ln(I)_aLn(II)_{1-a})_xSi_yO_z$ (Ln(I), Ln(II)=La, Y, Gd, Ga) may be used. Moreover, a phosphor material represented by $(Ln(I)_aLn(II)_{1-a})_2SiO_5$ or $(Ln(I)_aLn(II)_{1-a})_2Si_2O_7$ (Ln(I), Ln(II)=La, Y, Gd, Ga) is desirable. More specifically, a phosphor material having a host material represented by any of $Y_2SiO_5$, $(Y, Gd)_2SiO_5$, $(Y, La)_2SiO_5$, $La_2SiO_5$, and $Y_2Si_2O_7$, is desirable.

Moreover, the following phosphor materials may be used.

At least one of the green phosphors constituting a green phosphor mixture desirably has a host material of a halide compound containing a halogen X (X=F, Cl, Br) and oxygen (O), more desirably a halide represented by LnOX (Ln=La, Y, Gd, Ga; and X=F, Cl, Br). More specifically, a phosphor material having a host material represented by a chemical formula LaOCl is desirable.

Furthermore, the following phosphor materials may be used.

At least one of the green phosphors composing a green phosphor mixture desirably has a host material of an oxide represented by a chemical formula $Ln_2O_3$ (Ln=La, Y, Gd), and more particularly, a phosphor material having a host material represented by a chemical formula $Y_2O_3$.

At least one of the green phosphors forming a green phosphor mixture desirably has a host material of an aluminate containing aluminum Al and oxygen (O), further desirably an aluminate represented by a chemical formula $Ln_xAl_yO_z$ (Ln=La, Y, Gd, Ga). A phosphor material is further desirably represented by a chemical formula $Ln_3Al_5O_{12}$ (Ln=La, Y, Gd, Ga). More specifically, a phosphor material having a host material represented by any of chemical formulas $Y_3Al_5O_{12}$, $Y_3(Al, Ga)_5O_{12}$, $Gd_3(Al, Ga)_5O_{12}$, and $(Y, Gd)_3(Al, Ga)_5O_{12}$, is desirable.

The green phosphors forming a green phosphor mixture desirably have the following host materials in view of compensating brightness.

At least one of the green phosphors composing a green phosphor mixture is desirably a phosphor material in which the luminescence center is terbium (Tb) and a host material composition is $LaPO_4$. Furthermore, at least one of the green phosphors is desirably a phosphor material in which the luminescence center is terbium (Tb) and a host material composition is $CeMgAl_{11}O_{19}$.

Moreover, each of the green phosphors desirably contains cerium (Ce) as a sensitizer.

On the other hand, as a host material for the red phosphor material to be employed in the constitution of the present invention, the phosphor materials having the following compositions are desirable.

At least one of the phosphors forming a red phosphor mixture desirably has a host material of a vanadate containing phosphorus (P), vanadium (V), and oxygen (O), and more specifically, a phosphor having a host material represented by a chemical formula $Y_xGd_y(P_zV_{1-z})O_4$. Furthermore, at least one of the phosphors forming a red phosphor mixture desirably has europium (Eu) as the luminescence center and $Y_2O_3$ as the host material composition.

As another constitution for carrying out the present invention, not a green phosphor mixture but a single green phosphor may be used as mentioned below.

In a liquid crystal display device comprising a white light source having a blue phosphor emitting blue light, a green phosphor emitting green light, and a red phosphor emitting red light and having a light-on state and a light-off state in a single frame, and a liquid crystal display panel which controls the amount of transmitted light from the white light source for each pixel, and which has a color filter for allowing one of blue light, green light, and red light to be transmitted therethrough for each pixel, the green color phosphor has a luminescence center of terbium (Tb) and a host material composition is formed of any one of $Y_2SiO_5$, $(Y, Gd)_2SiO_5$, $(Y, La)_2SiO_5$, and $La_2SiO_5$.

In a liquid crystal display device comprising a white light source having a blue phosphor emitting blue light, a green phosphor emitting green light, and a red phosphor emitting red light provided therein and having a light-on state and a light-off state in a single frame, and a liquid crystal display panel which controls the amount of transmitted light from the white light source for each pixel, and which has a color filter for allowing one of blue light, green light, and red light to be transmitted therethrough for each pixel, the green color phosphor has a luminescence center of terbium (Tb) and a host material composition of $Y_3(Al, Ga)_5O_{12}$.

In a liquid crystal display device comprising a white light source having a blue phosphor emitting blue light, a green phosphor emitting green light, and a red phosphor emitting red light provided therein and having a light-on state and a light-off state in a single frame, and a liquid crystal display panel which controls the amount of transmitted light from the white light source for each pixel, and which has a color filter for allowing one of blue light, green light, and red light to be transmitted therethrough for each pixel, the green color phosphor has a luminescence center of terbium (Tb) and a host material composition of LaOCl.

Each of the green phosphors mentioned above desirably contains cerium (Ce) as a sensitizer.

On the other hand, a light source desirably has the following constitution.

A white light source is desirably a cold cathode fluorescent lamp, a hot cathode fluorescent lamp, or a white light emitting diode (LED) having a light emitting diode (LED) emitting ultraviolet light in combination with phosphors.

Note that the present invention should not be limited by the aforementioned constitution and Examples mentioned later. Needless to say, the present invention can be modified without departing from the technical idea of the invention.

By virtue of the aforementioned means, the present invention successfully provides a moving picture displayable liquid crystal display device simultaneously attaining satisfactory moving picture characteristics, color reproducibility and reliability.

Other objects, features and advantages of the invention will become apparent from the following description of the embodiments of the invention taken in conjunction with the accompanying drawings.

BRIEF DESCRIPTION OF THE DRAWINGS

FIG. 4 is a sectional view illustrating a structure of a liquid crystal display panel.

FIGS. 5(a), (b) and (c) are each a diagram illustrating a blink back light system.

DESCRIPTION OF REFERENCE NUMERALS

Figure 1A:
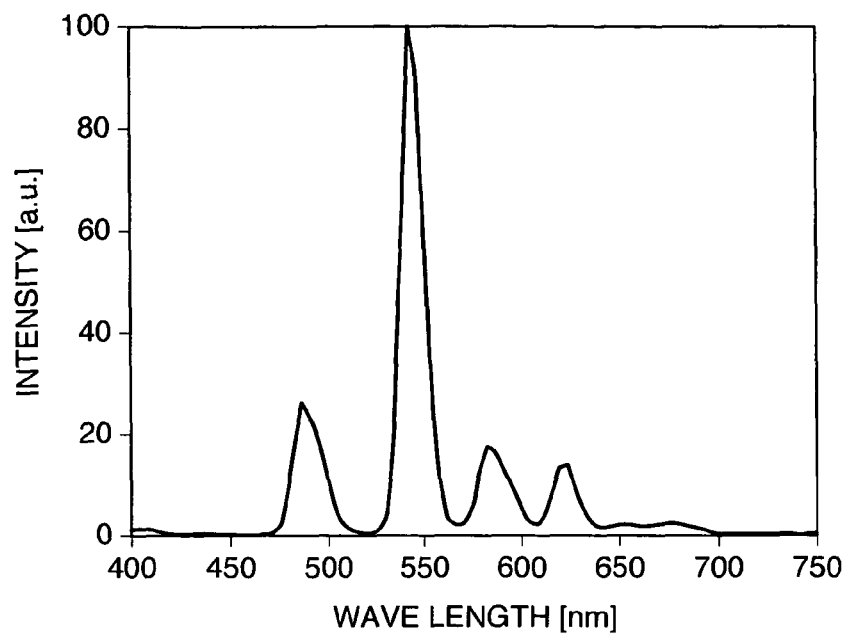
FIGS. 1(a) and (b) are an emission spectrum of a green phosphor mixture used in Example 1 and a color coordinate showing the color gamut of a liquid crystal display device formed by use of the green phosphor mixture, respectively.

1. Back light unit
2. Liquid crystal display panel
3. Metal case
4. Reflector
5. Cold cathode fluorescent lamp
6. Diffuser plate or diffuser sheet
7. (7A, 7B) Prism sheet
8. Reflective polarizer
9. Inverter or light source driving circuit
10. Case
11. Glass tube
12. Phosphor
13. Electrode
14. Filament
15. Semiconductor emitting device
16. Glass substrate
17. Polarizer
18. Pixel electrode
19. Thin-film transistor (TFT)
20. Alignment layer
21. Liquid crystal
22. (22A, 22B, 22C) Color filter
23. Light guide plate
24. LED

DESCRIPTION OF PREFERRED EMBODIMENT

Embodiments of the present invention will be described in more detail with reference to the accompanying drawings.

First, a liquid crystal display device has the following structure.

In a liquid crystal display device comprising a white light source of the blink back light system having a blue phosphor emitting blue light (the main emission peak wavelength is about 400 to 500 nm), a green phosphor emitting green light (the main emission peak wavelength is about 500 to 600 nm), and a red phosphor emitting red light (the main emission peak wavelength is about 600 to 650 nm) provided therein, and having a light-on state and a light-off state in a single frame, and a liquid crystal display panel which controls the amount of transmitted light from the white light source for each pixel, and which has a color filter for allowing one of blue light, green light, and red light to be transmitted therethrough for each pixel, at least one of the blue, green and red phosphors is a phosphor mixture prepared by mixing at least two types of phosphors having different host material compositions and the same element as the luminescence center.

More specifically, the green phosphor is a green phosphor mixture prepared by mixing at least two types of phosphors different in host material composition. All the phosphors to be mixed must have terbium (Tb) as the luminescence center. On the other hand, the red phosphor is a red phosphor mixture prepared by mixing at least two types of phosphors different in host material composition. All the phosphors to be mixed must have europium (Eu) as the luminescence center.

On the other hand, when green phosphors having different luminescence centers, phosphors having a luminescence peak wavelength within the region of 545±15 nm are exclusively mixed. Furthermore, when red phosphors are mixed, phosphors having a luminescence peak wavelength within the region of 615±15 nm are exclusively mixed. Moreover, when blue phosphors are mixed, phosphors having a luminescence peak wavelength within the region of 450±15 nm are exclusively mixed.

Ideally, one type of phosphor may be used per color. However, since a wide variety of characteristics such as high brightness, high speed response, high reliability, and high color reproducibility are required for a phosphor material, it is often difficult for one type of phosphor material to satisfy all characteristics. In particular, a green phosphor cannot satisfy high-speed response, high reliability, and high color reproducibility at the same time with a conventional technique as described above. Then, in the present invention, at least two types of green phosphors different in host material composition are mixed to prepare a green phosphor mixture capable of satisfying all requisite characteristics. Furthermore, at least two types of red phosphors different in host material composition are mixed to prepare a red phosphor mixture capable of satisfying all requisite characteristics.

For mixing phosphors of each color, conditions: (1) they have the same luminescent center, and (2) a luminescent peak wavelength falls within the predetermined wavelength range, become important. The color gamut of a liquid crystal display device can be ensured by mixing phosphors satisfying at least one of these conditions. In particular, a green phosphor can satisfy the requirements for high-speed response and high reliability without narrowing the color gamut for the reasons below.

A green phosphor mixture is prepared only by green phosphors having terbium (Tb) as the luminescence center. The first point of the present invention resides in this. Generally, an emission color of a phosphor, namely, an emission spectrum, varies depending upon the luminescence center. As the luminescence center of green light, Tb, Eu (divalent) and Ce can be considered. Of them, a phosphor material using Tb as the luminescence center has a spectrum in which a main peak resides in the vicinity of 545 nm (energy transfer $^5D_4 \rightarrow {}^7F_5$) and sub peaks reside at both sides thereof, that is, in the vicinity of 490 nm ($^5D_4 \rightarrow {}^7F_6$), in the vicinity of 590 nm ($^5D_4 \rightarrow {}^7F_4$), and in the vicinity of 625 nm ($^5D_4 \rightarrow {}^7F_3$) without being influenced by the composition of a host material. Therefore, even if at least two types of green phosphor materials having Tb as the luminescence center are mixed, the resultant color will not virtually change. In other words, the values represented by u' and v' in the color coordinate of 1976CIE do not substantially change. Furthermore, in phosphors having Tb as the luminescence center, response characteristics greatly differ depending upon difference between host materials. Therefore, by selecting a proper host material, high-speed response can be attained without changing color (especially, without decreasing blue calorimetric purity). As to the green phosphor with a luminescence center of Tb, exhibiting a high-speed response, several types of phosphors were found based on speed response evaluation performed by the present inventors. They have a higher speed response than a conventional one, $LaPO_4$:Tb, Ce. Details of materials for these phosphors will be described later.

In the present invention, response characteristics are improved by preparing a green phosphor mixture only from phosphors having a luminescence center of Tb, without causing color change, especially without causing deterioration in blue calorimetric purity. The improvement of such response characteristics can be attained simply by mixing phosphor materials varied in host material composition.

Next, we will discuss the response characteristics of these green phosphor mixtures. As mentioned above, it is strongly expected to employ the blink back light system in a moving picture compatible liquid crystal display. In the circumstance, the high-speed response of a white light source must be attained. To repeat light-on and light-off states in a single frame within which a single image is written, the sum of brightness-response rise time and fall time of the green phosphor mixture must fall within a single frame of time, In the liquid crystal display device presently in use, a single frame is 16.7 msec in the case of 60 Hz. If the sum exceeds a single time frame, blinking is not ideally performed. This means that if the blink back light system is employed, the quality of a moving picture will not be improved beyond expectation. The "brightness response time" for each phosphor material is defined as time until the brightness changes by 90% based on a maximum brightness being 100%. To explain more specifically, 90% brightness rise time $\tau_{on}$ is the time required for a brightness to rise from 0% to 90%, whereas 10% brightness fall time $\tau_{off}$ is the time required for a brightness to fall from 100% to 10%.

Furthermore, in consideration that the brightness rise time and falling time of a phosphor material is virtually equal, each of the brightness rise time and falling time is desirably a half of the single frame of time, Based on the results of evaluation for a moving picture formed by a liquid crystal display device, it has been reported that quality deterioration of a moving picture cannot be visually recognized by a human when light is on for one fourth (Duty 25%) of a single time frame in the case of 60 Hz presently in use. From this, it is desirable that the brightness rise time and falling time each are 4 msec or less. Furthermore, in consideration that the human optic nerve pulses 300 times per second, it is desirable that the brightness rise time and falling time each are 3 msec or less.

Next, we will discuss a high-speed response green phosphor satisfying the aforementioned time limitation. As mentioned above, the present inventors paid attention to a green phosphor having a luminescence center of Tb, and evaluated various types of green phosphors different in host material for response characteristics. As a result, they found that a high-speed response can be attained by using the phosphors having the following host material compositions. The phosphors are classified based on compositions of host materials, they are divided into phosphors formed of silicates, aluminates, halides, and oxides, as host materials. Table 2 summarizes representative phosphors versus response characteristics. A second point of the present invention resides in use of a green phosphor having a luminescence center of Tb and exhibiting a high-speed response shown below.

Silicates are compounds containing silicon (Si) and oxygen (O) as components. Of them, a silicate represented by a chemical formula, $Ln_2SiO_5$ or $Ln_2Si_2O_7$ (Ln=La, Y, Gd) is desirable. Alternatively, use may be made of $(Ln(I)_aLn(II)_{1-a})_2SiO_5$ or $(Ln(I)_aLn(II)_{1-a})_2Si_2O_7$ where two types of Ln are used. More specifically, phosphor materials having a luminescence center of Tb and host materials being $Y_2SiO_5$, $(Y, Gd)_2SiO_5$, $(Y, La)_2SiO_5$, $La_2SiO_5$, and $Y_2Si_2O_7$ are preferable.

Note that the compositions indicated herein are basic ones. The compositions may be considered as the same if the ratio of components differs within ±5%. For example, $Y_2Si_{0.95}O_5$ and $Y_2Si_{1.05}O_5$ may be considered to be equivalent to $Y_2SiO_5$. Furthermore, the compositions shown herein is not described in consideration of the presence of a small amount of impurities. A phosphor is generally synthesized from a flux (melting). Therefore, after the phosphor thus synthesized inevitably contains small amounts of elements constituting the flux as impurities irrelevant to optical characteristics. However, the present specification describes out of consideration of such impurities. For instance an $Y_2SiO_5$ phosphor sometimes contains small amounts of cationic ions such as Li, Sc, and Ba as impurities. In this case, it is described as $Y_2SiO_5$ in the specification.

Aluminates are compounds containing aluminum (Al) and oxygen (O). Of them, an aluminate represented by a chemical formula, $Ln_3Al_5O_{12}$, (Ln=La, Y, Gd, Gd) is desirable. More specifically, phosphor materials having a luminescence center of Tb and host materials being $Y_3Al_5O_{12}$, $Y_3(Al, Ga)_5O_{12}$, $Gd_3(Al, Ga)_5O_{12}$, and $(Y, Gd)_3(Al, Ga)_5O_{12}$ are preferable. Note that the component ratios are as described above.

Furthermore, a high-speed response phosphor material can be obtained by use of a halide LnOX (Ln=La, Y, Gd, Ga) containing a halogen X (X=F, Cl, Br) and oxygen (O) and an oxide represented by $Ln_2O_3$ (Ln=La, Y, Gd). In particular, in phosphor materials having a luminescence center of Tb and having host materials being LaOCl and $Y_2O_3$, the values of $\tau_{on}$ and $\tau_{off}$ both being 2 msec or less can be obtained as shown in Table 2.

However, the reason why a high-speed response can be attained by these phosphors is still unknown. Conceivably, it may be due to a symmetrical crystal structure of a host material or symmetrical arrangement of Tb atoms in the host material crystal structure.

TABLE 2

| Response characteristics of green phosphors | | | |
|---|---|---|---|
| Classification | Phosphor material | $\tau_{on}$[msec] | $\tau_{off}$[msec] |
| Silicate | $Y_2SiO_5$:Tb | 2.4 | 3.1 |
| | $LaSiO_5$:Tb | 2.3 | 3.1 |
| | $(Y,Gd)_2SiO_5$:Tb | 3.0 | 3.8 |
| | $(Y,La)_2SiO_5$:Tb | 2.4 | 3.1 |
| | $Y_2Si_2O_7$:Tb | 2.4 | 3.3 |
| Aluminate | $Y_3Al_5O_{12}$:Tb | 2.6 | 3.8 |
| | $Y_3(Al,Ga)_5O_{12}$:Tb | 3.4 | 4.3 |
| | $Gd_3(Al,Ga)_5O_{12}$:Tb | 2.5 | 3.4 |
| | $(Y,Gd)_3(Al,Ga)_5O_{12}$:Tb | 3.6 | 4.3 |
| Halide | LaOCl:Tb | 1.3 | 1.8 |
| Oxide | $Y_2O_3$:Tb | 0.8 | 1.5 |

The emission spectra of the phosphor materials listed in Table 2 are shown in FIGS. 7 to 10. As is apparent from these spectra, no difference is observed from a spectrum of $LaPO_4$:Tb, Ce presently in use, even if a host material is changed. This means that a liquid crystal display device using each of the phosphor materials will give little chromaticity change. More specifically, blue calorimetric purity will not deteriorate.

Furthermore, in the case of a green phosphor mixture, not only response characteristics but also brightness is an important factor, as described above. At present, $LaPO_4$:Tb, Ce is used. This is because the brightness is quite high. Then, in consideration of the brightness characteristic, at least one type of green phosphors forming a green phosphor mixture must be a phosphor containing $LaPO_4$ as a host material. Alternatively, use may be also made of $CeMgAl_{11}O_{19}$:Tb, which is a phosphor material having a quite high brightness even through its response characteristics is not so high. Moreover, when a phosphor having a luminescence center of Tb is excited by ultraviolet light, the brightness can be improved if Ce is contained as a sensitizer. This is because energy can be transferred from Ce to Tb by introducing Ce, with the result that the excitation spectrum can extend toward a long wavelength side. Therefore, the brightness can be improved by containing Ce as a sensitizer in Tb phosphors having a silicate, halide, oxide and aluminate as a host material. Note that response characteristics will not deteriorate by adding Ce as a sensitizer.

These phosphors are stable also from a chemical point of view, so that the brightness will not deteriorate by processing. Therefore, all three points of high-speed response, color reproducibility and reliability can be satisfied by use of these phosphors.

In the foregoing, means for satisfying various characteristics such as response characteristics by mixing various types of same color phosphors. However, in view of cost and simplification of a process, only one type of green phosphor is desirably used. The brightness of a phosphor significantly depends upon the concentration of Tb and thus can be improved by optimizing the Tb concentration. In particular, in $Y_2SiO_5$, $(Y.Gd)_2SiO_5$, $(Y.La)_2SiO_5$, $La_2SiO_5$, $Y_3(Al, Ga)_5O_{12}$, and LaOCl, the same brightness as that present in use can be obtained by optimizing the Tb concentration and adding Ce as a sensitizer. In this case, not a green phosphor mixture but a single green phosphor can be used.

More specifically, in a liquid crystal display device comprising a white light source having a blue phosphor emitting blue light, a green phosphor emitting green light, and a red phosphor emitting red light provided therein and having a light-on state and a light-off state in a single frame, and a liquid crystal display panel which controls the amount of transmitted light from the white light source for each pixel, and which has a color filter for allowing one of blue light, green light, and red light to be transmitted therethrough for each pixel, the green color phosphor desirably has a luminescence center of terbium (Tb) and a host material composition formed of any one of $Y_2SiO_5$, $(Y, Gd)_2SiO_5$, $(Y, La)_2SiO_5$, and $La_2SiO_5$. Alternatively, use may be made of a liquid crystal display device formed of a phosphor having a host material composition of $Y_3 (Al, Ga)_5O_{12}$. Also, use may be made of a liquid crystal display device formed of a phosphor having a host material composition of LaOCl. By use of the liquid crystal display devices thus constructed, three features: high-speed response, color reproducibility and reliability, can be simultaneously satisfied.

Figure 3A:
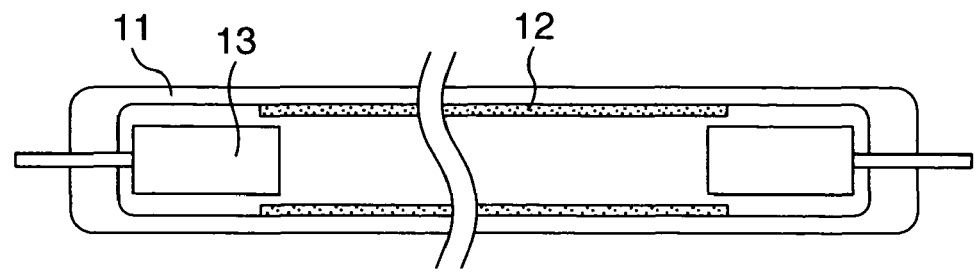
FIGS. 3(a), (b) and (c) each are a sectional view illustrating the structure of a white light source.
Figure 3B:
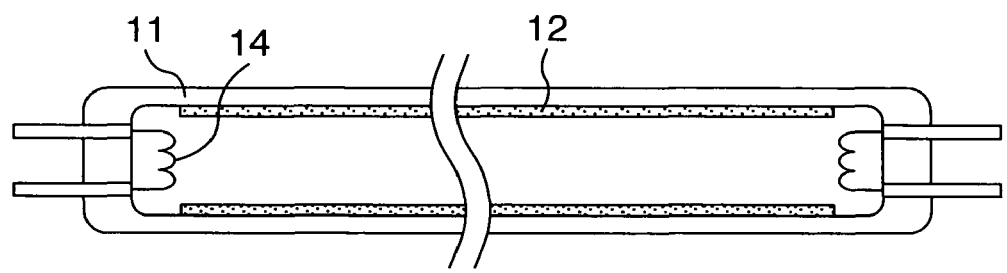
Figure 3C:
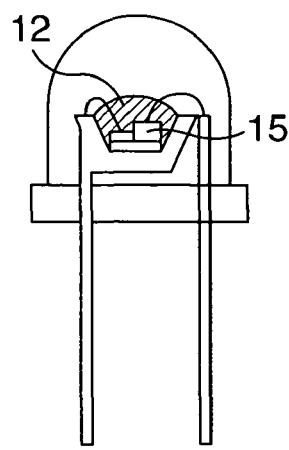

Next, the while light source used herein will be discussed as to its form. As a white light source for use in liquid crystal display device employing these phosphors, mention is made of a cold cathode fluorescent lamp (CCFL) shown in FIG. 3(a). In consideration of a tendency for a large-sized liquid crystal television in future, a hot cathode fluorescent lamp (HCFL) having a large-diameter tube may be used. A HCFL is characterized by a filament 14 arranged at both ends, compared to a CCFL, as shown in FIG. 3(b). Because of the presence of the filament, a HCFL cannot be reduced in size, unlike a CCFL. However, HCFL has a high luminescence efficiency compared to a CCFL, so that it is advantageous in use for a liquid crystal display device requiring a high brightness such as a liquid crystal TV. Furthermore, a white light emitting diode (LED) may be used in combination with an ultraviolet light emitting LED as shown in FIG. 3(c), as the white light source.

Now, specific Examples will be described. Note that a liquid crystal display device using a conventional green phosphor, $LaPO_4$:Tb, Ce will be described in Comparative Example 1. Also a liquid crystal display device using a green phosphor mixture of $LaPO_4$:Tb, Ce and $SrAl_2O_4$:Eu, already known to public, will be described in Comparative Example 2. Note that the present invention should not be limited by the following Examples.

EXAMPLE 1

Figure 2:
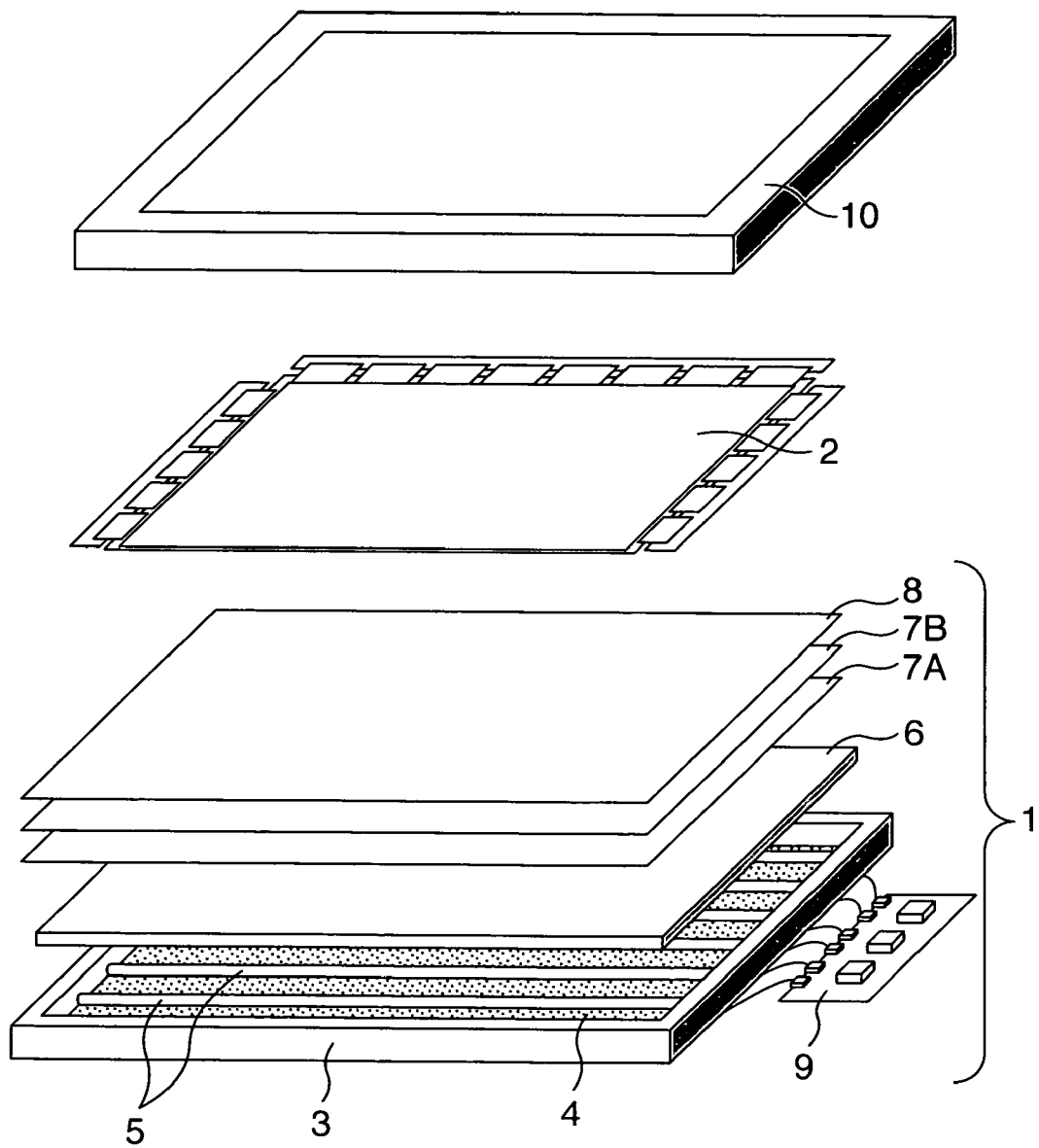
FIG. 2 is an exploded perspective view of a liquid crystal display device according to Examples 1 to 9 and Comparative Examples 1 and 2.

The liquid crystal display device of this Example has the same structure as that of a conventional one. The schematic structure is shown in FIG. 2. What is different from the conventional one is a green phosphor material used in CCFL. In this Example, a green phosphor mixture is used as a green phosphor, more specifically, a mixture of $LaPO_4$:Tb, Ce and $Y_2SiO_5$; Tb, Ce is used. Now, a process for manufacturing a CCFL using these phosphors and a process for manufacturing a liquid crystal display device using the CCFL will be described.

Figure 11:
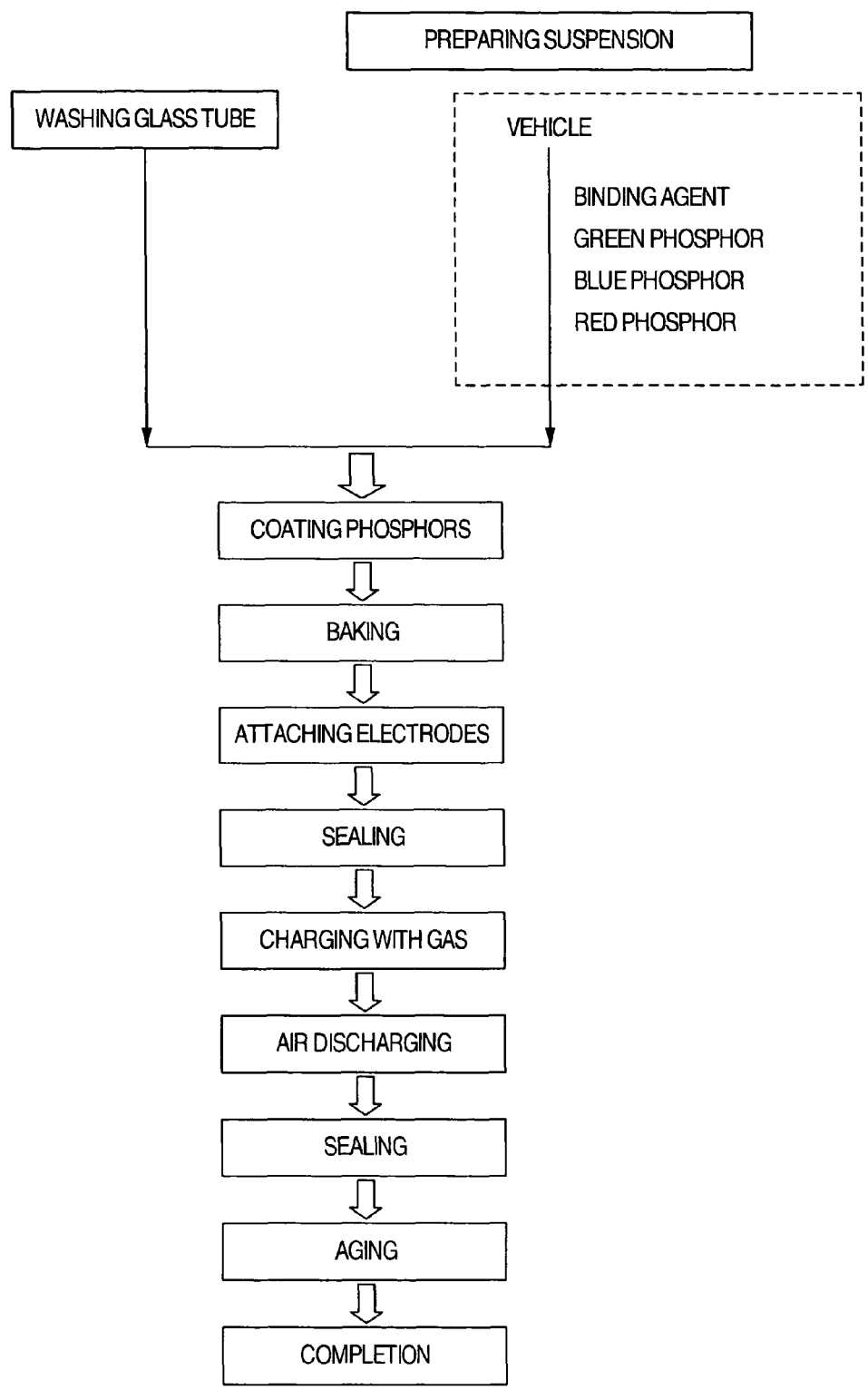
FIG. 11 is a flowchart of a process for manufacturing a white light source CCFL.

A CCFL is generally manufactured in accordance with steps shown in FIG. 11. The structure of the CCFL manufactured is shown in FIG. 3(a). First, a binding agent such as alumina and phosphor materials are mixed in an organic solvent called a vehicle. In this Example, as a blue phosphor and a red phosphor, conventional $BaMgAl_{10}O_{17}$:Eu and $Y_2O_3$:Eu are used, respectively. As a green phosphor, a green phosphor mixture of $LaPO_4$:Tb, Ce and $Y_2SiO_5$; .Tb, Ce is used. Note that two types of green phosphors: $LaPO_4$:Tb, Ce and $Y_2SiO_5$; Tb, Ce are mixed in a ratio of 0.2 to 0.8. The emission spectrum of the green phosphor mixture is shown in FIG. 1(a). The spectrum exhibits almost the same profile as that of a conventional phosphor, $LaPO_4$:Tb, Ce. Response characteristics, $\tau_{on}$=2.9 msec and $\tau_{off}$=3.6 msec, are reduced to about 60%, compared to those of a conventional $LaPO_4$: Tb, Ce.

To a suspension having these phosphors mixed therein, an end of a glass tube already washed is dipped. In this manner, the inner wall of the glass tube was coated with phosphors by use of the capillary action. The glass tube of 3 mm in diameter is formed of copal glass. Subsequently, the glass tube is baked (sintered) to fix the phosphors onto the inner wall of the tube. Thereafter, electrodes are attached and the end of the glass tube is sealed. Then, rare gases such as argon (Ar) and neon (Ne) are introduced into the tube through the other end opposite to the sealed end. The air is removed from the tube in this manner to control a gas pressure. After mercury is injected, the glass tube is sealed. The glass tube is illuminated for a predetermined time. In this way, aging is performed.

The CCFL thus completed is arranged in a metal case 3 shown in FIG. 2. In the liquid crystal display device requiring high brightness such as a liquid crystal television, a direct type of CCFL is employed where a plurality of CCFLs are placed next to each other at the same plane. Between the metal case 3 and the CCFL 5, a reflector 4 is arranged for efficiently using light emitted from the CCFL toward the case. In addition, to minimize the in-plane brightness distribution of the liquid crystal display device, a diffuser plate 6 is arranged immediately on the CCFL. Furthermore, to improve the brightness, the prism sheets 7 and a reflective polarizer 8 are arranged. To the CCFL, an inverter 9 is connected. The illumination of CCFL is controlled by driving the inverter. These structural elements are collectively called a back light unit.

Figure 6A:
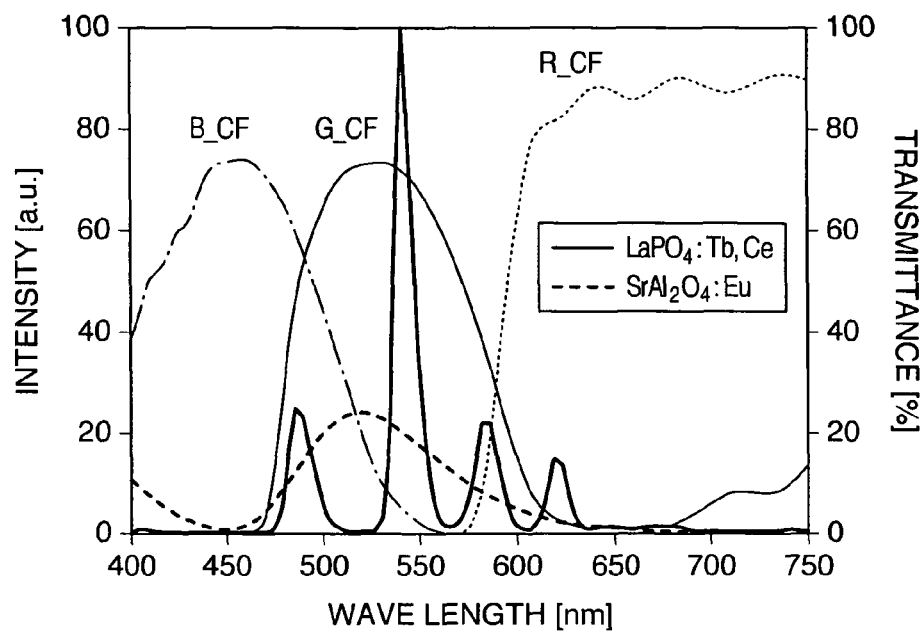
FIGS. 6(a) and 6(b) are an emission spectrum of a green phosphor according to the prior art and a color gamut of a liquid crystal display device in use of the green phosphor, respectively.
Figure 6B:
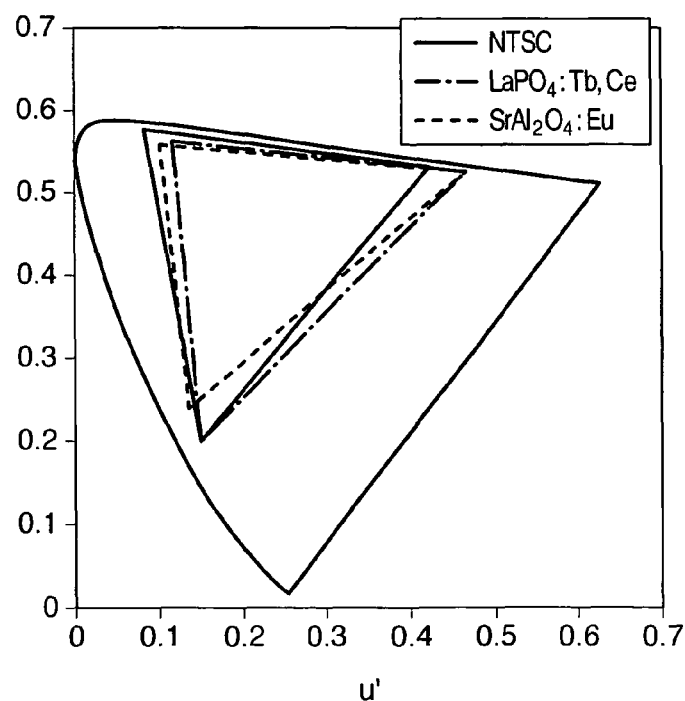
Figure 7:
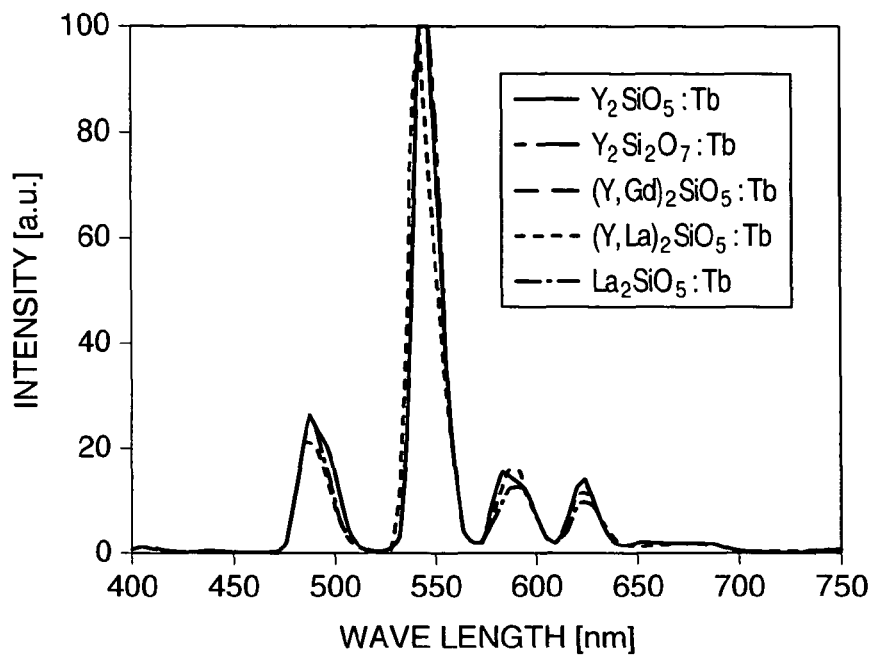
FIG. 7 is an emission spectrum of a silicate phosphor having a luminescence center of Tb and exhibiting a high-speed response, which is found in the present invention.
Figure 8:
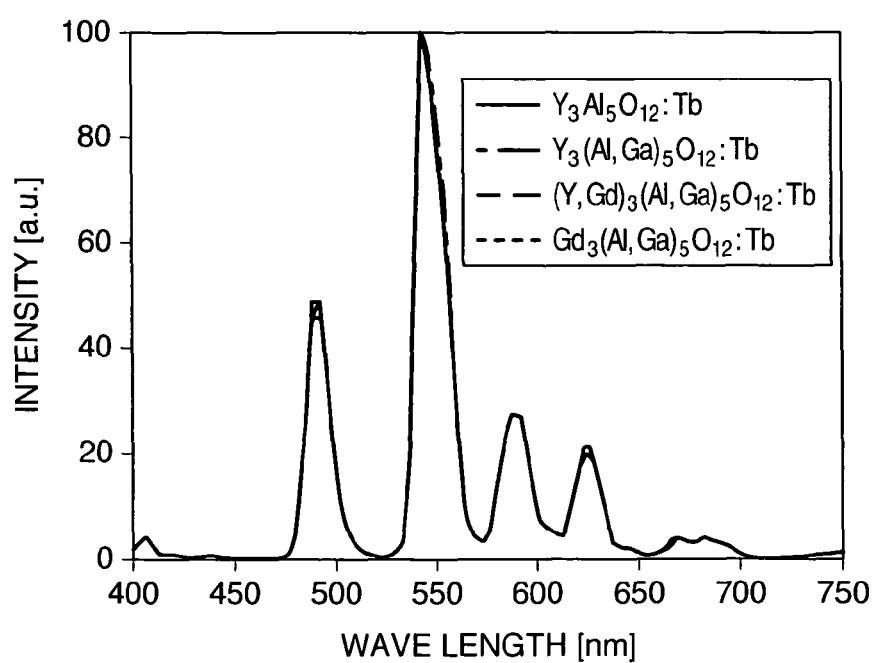
FIG. 8 is an emission spectrum of an aluminate phosphor having a luminescence center of Tb and exhibiting a high-speed response, which is found in the present invention.
Figure 9:
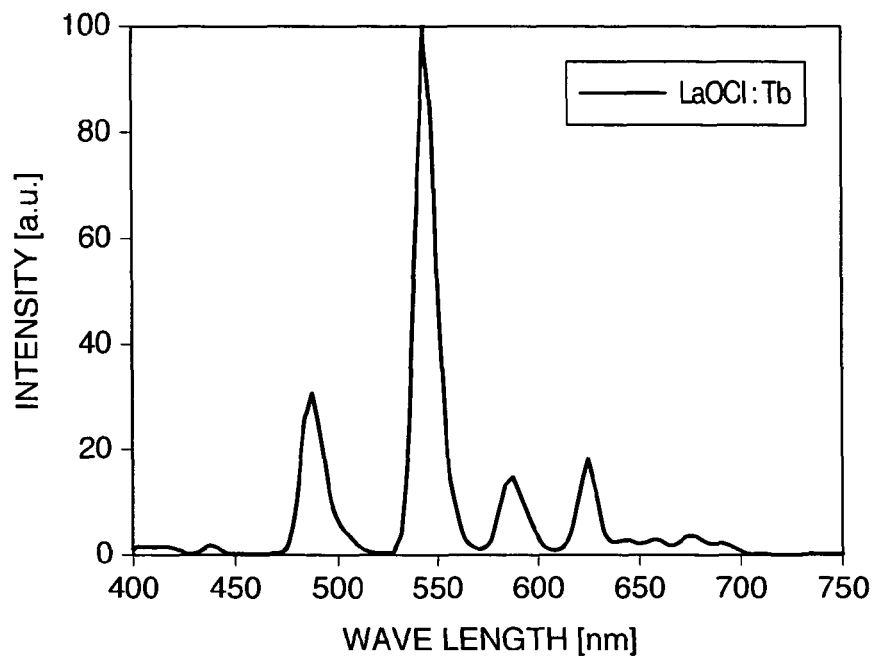
FIG. 9 is an emission spectrum of a halide phosphor having a luminescence center of Tb and exhibiting a high-speed response, which is found in the present invention.
Figure 10:
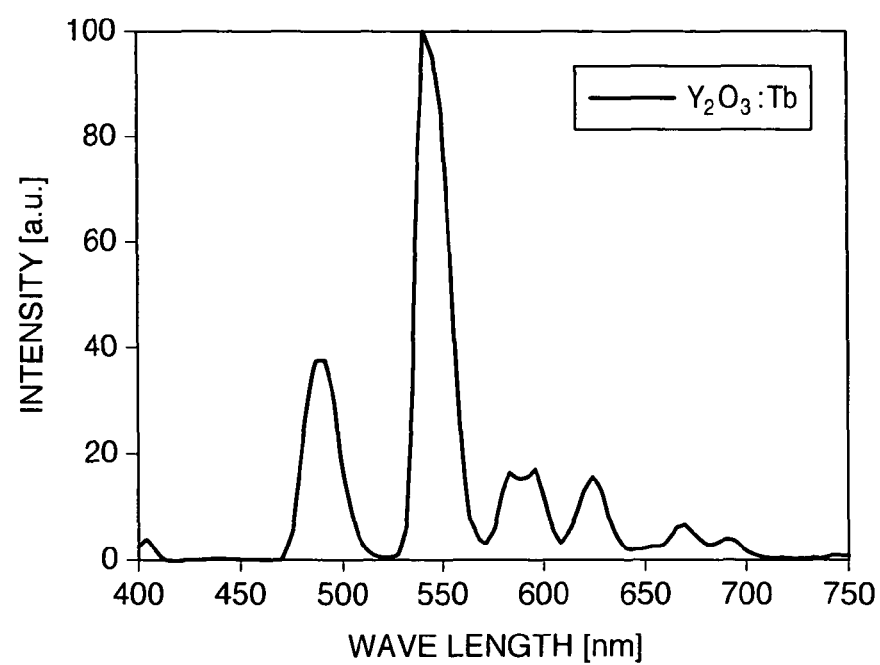
FIG. 10 is an emission spectrum of an oxide phosphor having a luminescence center of Tb and exhibiting a high-speed response, which is found in the present invention.

Immediately on the back light unit 1, a liquid crystal panel 2 is arranged, which controls the amount of transmitted light from the back light (white light source, CCFL) and has a color filter by which the light is spectrally separated into red, green, and blue light components for each pixel. A schematic sectional view of the liquid crystal panel is shown in FIG. 4. As a pair of substrates 16, glass substrates generally having 0.5 mm in thickness are used. On one 16A of the substrates, electrodes 18 each are formed for each pixel and thin film transistors (TFT) 19 are formed for supplying voltage to these electrodes. Whereas, on the other substrate 16B, color filters 22 each are formed for each pixel. On each of the inner surfaces of such a pair of substrates, an alignment layer 20 is formed for aligning liquid crystal molecules. Liquid crystal 21 is sandwiched between the substrates. At the outside the substrate, a polarizer 17 (17A, 17B) are arranged. Note that the spectroscopic characteristic of the color filter according to this Example is shown in FIG. 6(a).

The color image is displayed by control of the TFT for each pixel. To explain more specifically, voltage is supplied to the electrode of each pixel to change the orientation of liquid crystal molecules, in other words, change the refractive index of the liquid crystal layer. In this manner, the amount of transmitted light from the back light is controlled and the resultant light is spectrally separated by a color filter. In this Example, a liquid crystal panel of an in-plane switching (IPS) system is explained. However, a liquid crystal display mode for use in carrying out the preset invention is not particularly limited. The TN mode, VA mode and OCB mode may be used.

In the last step, the back light unit and the liquid crystal panel are combined and covered with the case 10 to obtain the liquid crystals display device.

Figure 1B:
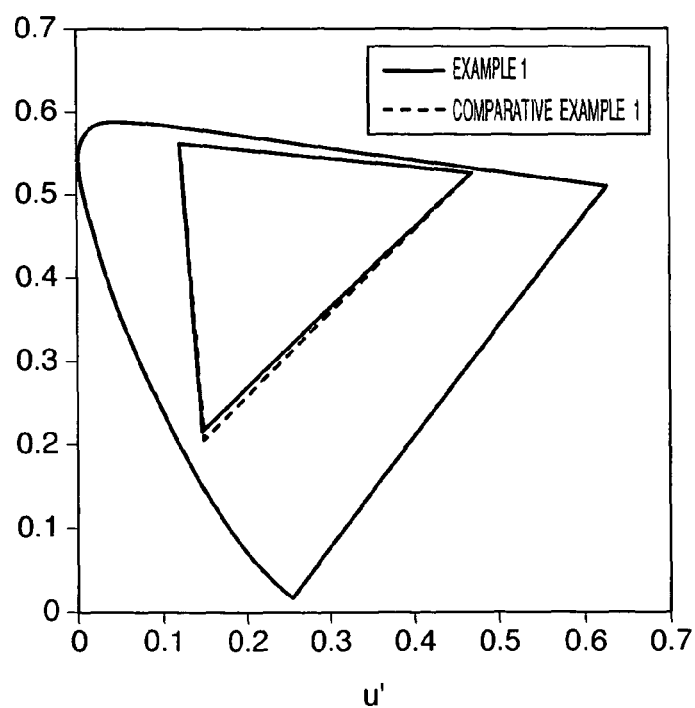

The color gamut of the liquid crystal display device thus obtained is shown in FIG. 1(b). Compared to the characteristics obtained in the liquid crystal display device of Comparative Example 1, the color gamut is virtually the same. The chromaticity change of blue is as very small as $\Delta u'$, $v'$=0.008, which is lower than human visual sensitivity ($\Delta u'$, $v'$<0.02).

In this Example, the response characteristics of a green phosphor can be significantly improved. Furthermore, a liquid crystal display device having no substantial change in chromaticity can be obtained. From this, it is demonstrated that three points of improvement of moving picture performance, suppression of chromaticity change, and reliability can be simultaneously attained.

EXAMPLE 2

This Example differs from Example 1 in the green phosphor mixture to be used; however, other constitutions are the same as in Example 1. In this Example, as the green phosphor mixture, a mixture of $LaPO_4$:Tb, Ce and $Y_3Al_5O_{12}$:Tb, Ce is used. The mixing ratio of $LaPO_4$:Tb, Ce to $Y_3Al_5O_{12}$:Tb, Ce is 0.1 to 0.9 on a molar basis.

Figure 12A:
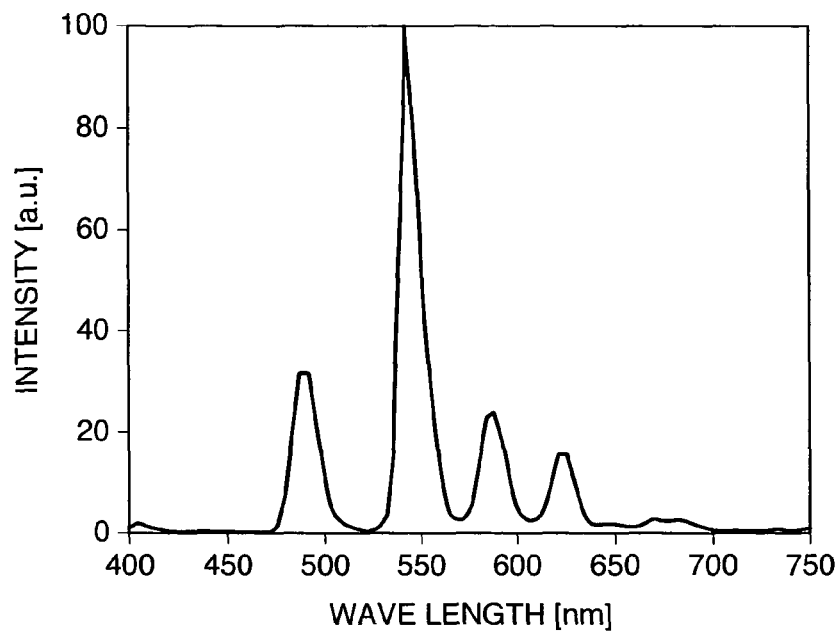
FIGS. 12(a) and (b) are the emission spectrum of a green phosphor mixture used in Example 2 and a color coordinate showing the color gamut of a liquid crystal display device formed by use of the green phosphor mixture, respectively.
Figure 12B:
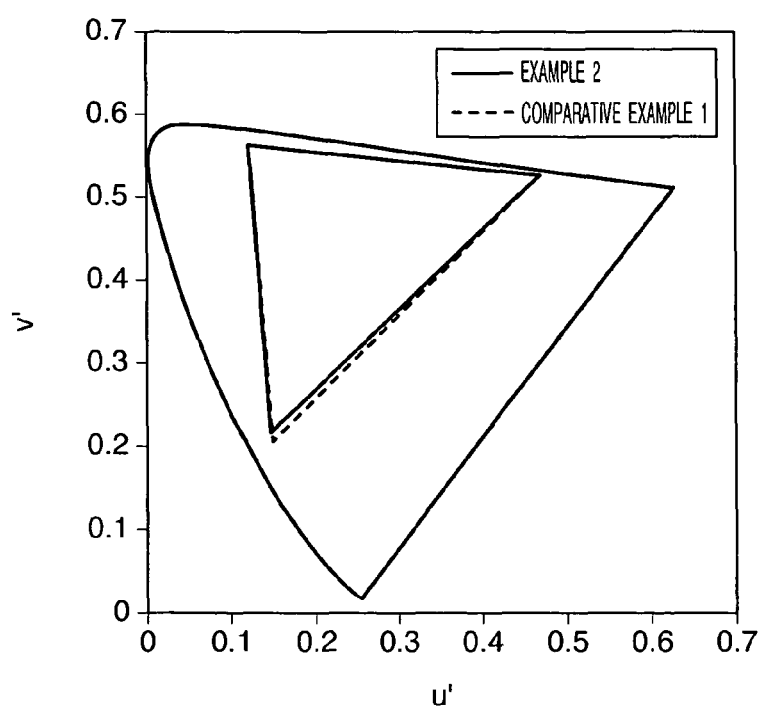

The emission spectrum of the green phosphor mixture is shown in FIG. 12($a$). The spectrum has substantially the same as that of $LaPO_4$:Tb, Ce conventionally used. The response characteristics are $\tau_{on}$=2.8 msec and $\tau_{off}$=4.0 msec, which are reduced to about 60% of a conventional $LaPO_4$:Tb, Ce.

The color gamut of the liquid crystal display device obtained in this Example is shown in FIG. 12($b$). The color gamut is substantially the same as that of Comparative Example 1 described later. The chromaticity change of a blue color is as extremely small as $\Delta u'$, $v'$=0.008, which is lower than a visual detection ability of a human ($\Delta u'$, $v'$<0.02).

The liquid crystal display device obtained in accordance with this Example is significantly improved in response characteristics of a green phosphor and has no substantial change in chromaticity. From this, it is demonstrated that three points of improvement of moving picture performance, suppression of chromaticity change, and reliability can be simultaneously attained.

EXAMPLE 3

This Example differs from Example 1 in the green phosphor mixture to be used; however, other constitutions are the same as in Example 1. In this Example, as the green phosphor mixture, a mixture of $LaPO_4$:Tb, Ce and LaOCL:Tb, Ce is used. The mixing ratio of $LaPO_4$:Tb, Ce to LaOCL:Tb, Ce is 0.3 to 0.7 on a molar basis.

Figure 13A:
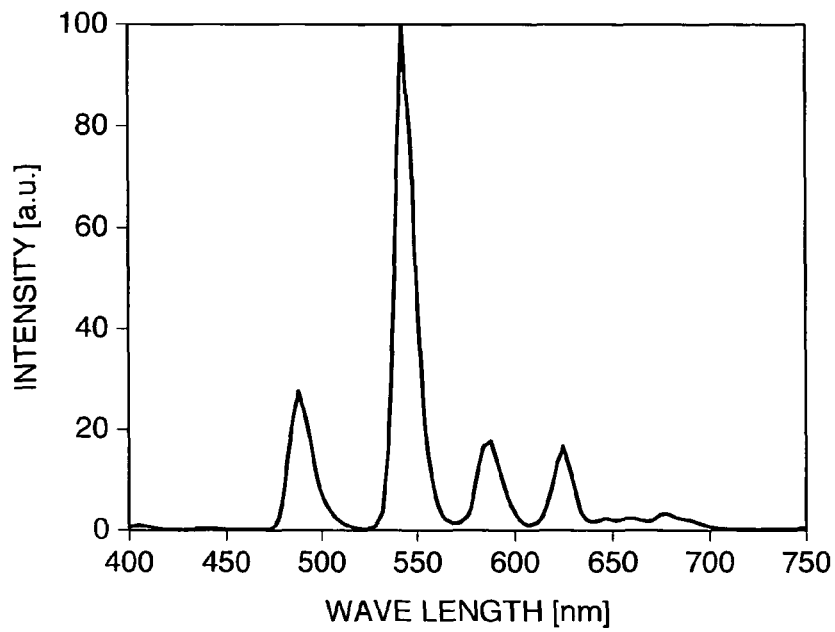
FIGS. 13(a) and (b) are the emission spectrum of a green phosphor mixture used in Example 3 and a color coordinate showing the color gamut of a liquid crystal display device formed by use of the green phosphor mixture, respectively.
Figure 13B:
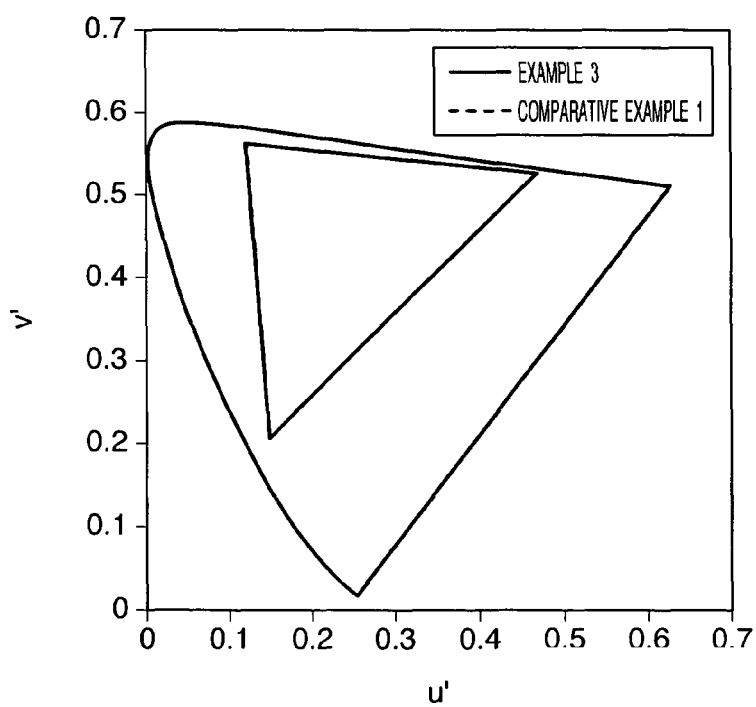

The emission spectrum of the green phosphor mixture is shown in FIG. 13($a$). The spectrum has substantially the same as that of $LaPO_4$:Tb, Ce conventionally used. The response characteristics are $\tau_{on}$=2.4 msec and $\tau_{off}$=3.0 msec, which are reduced to about 50% of a conventional $LaPO_4$:Tb, Ce.

The color gamut of the liquid crystal display device obtained in this Example is shown in FIG. 13($b$). The color gamut is substantially the same as that of Comparative Example 1 described later. The chromaticity change of a blue color is as extremely small as $\Delta u'$, $v'$=0.001, which is lower than a visual detection ability of a human ($\Delta u'$, $v'$<0.02).

The liquid crystal display device obtained in accordance with this Example is significantly improved in response characteristics of a green phosphor and has no substantial change in chromaticity. From this, it is demonstrated that three points of improvement of moving picture performance, suppression of chromaticity change, and reliability can be simultaneously attained.

EXAMPLE 4

This Example differs from Example 1 in the green phosphor mixture to be used; however, other constitutions are the same as in Example 1. In this Example, as the green phosphor mixture, a mixture of $LaPO_4$:Tb, Ce and $(Y, La)_2SiO_5$:Tb, Ce is used. The mixing ratio of $LaPO_4$:Tb, Ce to $(Y, La)_2SiO_5$:Tb, Ce is 0.2 to 0.8 on a molar basis.

Figure 14A:
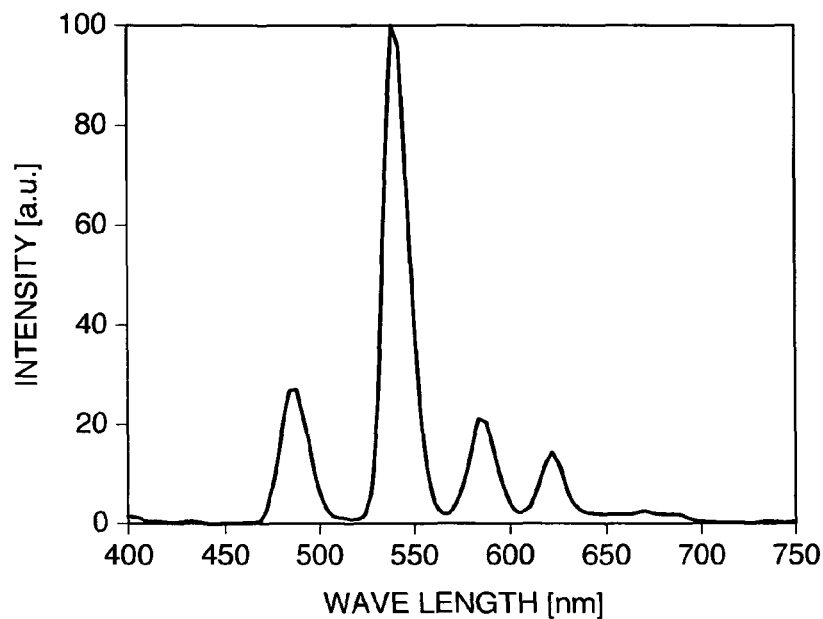
FIGS. 14(a) and (b) are the emission spectrum of a green phosphor mixture used in Example 4 and a color coordinate showing the color gamut of a liquid crystal display device formed by use of the green phosphor mixture, respectively.
Figure 14B:
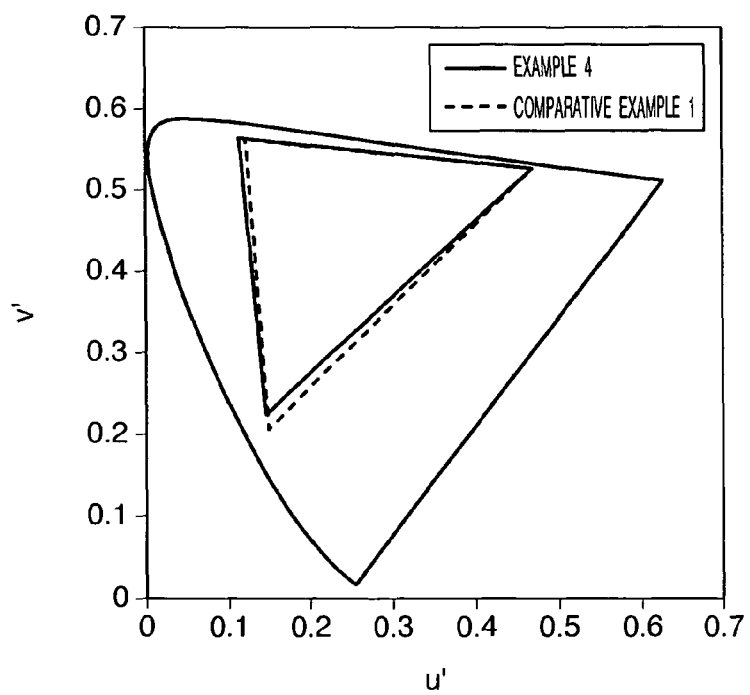

The emission spectrum of the green phosphor mixture is shown in FIG. 14($a$). The spectrum has substantially the same as that of $LaPO_4$:Tb, Ce conventionally used. The response characteristics are $\tau_{on}$=2.9 msec and $\tau_{off}$=3.8 msec, which are reduced to about 60% of a conventional $LaPO_4$:Tb, Ce.

The color gamut of the liquid crystal display device obtained in this Example is shown in FIG. 14($b$). The color gamut is substantially the same as that of Comparative Example 1 described later. The chromaticity change of a blue color is as extremely small as $\Delta u'$, $v'$=0.017, which is lower than a visual detection ability of a human ($\Delta u'$, $v'$<0.02).

The liquid crystal display device obtained in accordance with this Example is significantly improved in response characteristics of a green phosphor and has no substantial change in chromaticity. From this, it is demonstrated that three points of improvement of moving picture performance, suppression of chromaticity change, and reliability can be simultaneously attained.

EXAMPLE 5

This Example differs from Example 1 in the green phosphor mixture to be used; however, other constitutions are the same as in Example 1. In this Example, as the green phosphor mixture, a mixture of $LaPO_4$:Tb, Ce and $Y_2O_3$:Tb is used. The mixing ratio of $LaPO_4$:Tb, Ce to $Y_2O_3$:Tb is 0.3 to 0.7 on a molar basis.

Figure 15A:
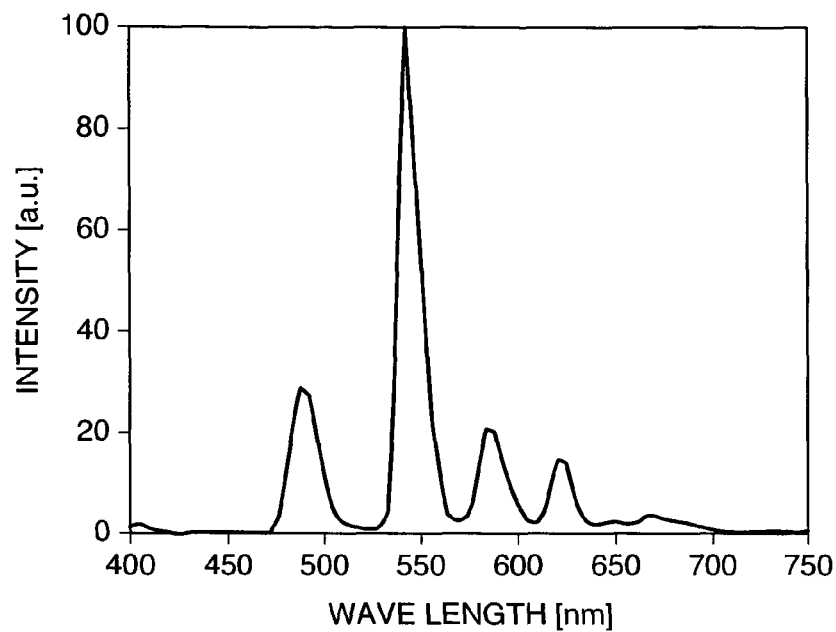
FIGS. 15(a) and (b) are the emission spectrum of a green phosphor mixture used in Example 5 and a color coordinate showing a color gamut of a liquid crystal display device formed by use of the green phosphor mixture, respectively.
Figure 15B:
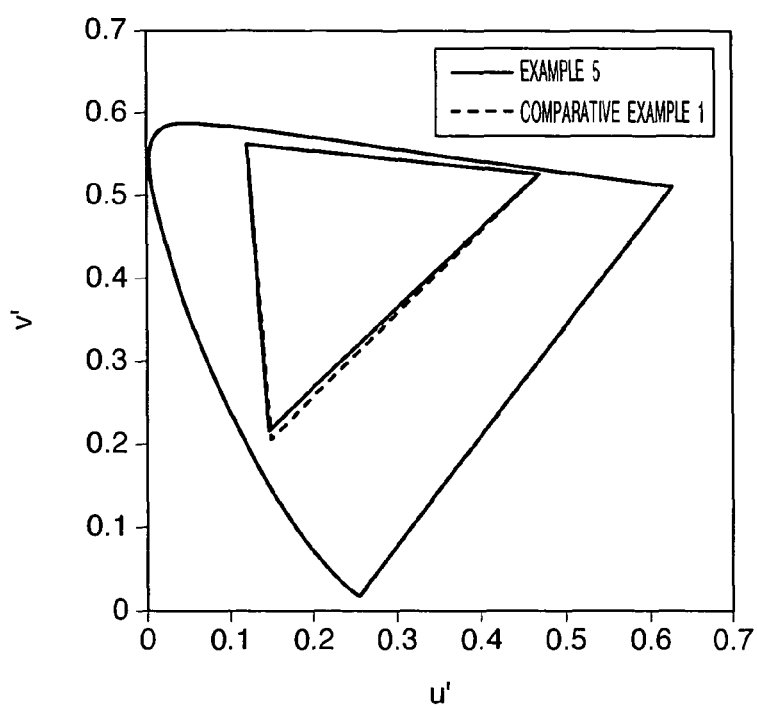

The emission spectrum of the green phosphor mixture is shown in FIG. 15($a$). The spectrum has substantially the same as that of $LaPO_4$:Tb, Ce conventionally used. The response characteristics are $\tau_{on}$=2.0 msec and $\tau_{off}$=2.8 msec, which are reduced to about 45% of a conventional $LaPO_4$:Tb, Ce.

The color gamut of the liquid crystal display device obtained in this Example is shown in FIG. 15($b$). The color gamut is substantially the same as that of Comparative Example 1 described later. The chromaticity change of a blue color is as extremely small as $\Delta u'$, $v'$=0.009, which is lower than a visual detection ability of a human ($\Delta u'$, $v'$<0.02).

The liquid crystal display device obtained in accordance with this Example is significantly improved in response characteristics of a green phosphor and has no substantial change in chromaticity. From this, it is demonstrated that three points of improvement of moving picture performance, suppression of chromaticity change, and reliability can be simultaneously attained.

EXAMPLE 6

This Example differs from Example 1 in the green phosphor mixture to be used; however, other constitutions are the same as in Example 1. In this Example, as the green phosphor mixture, a mixture of $CeMgAl_{11}O_{19}$:Tb and $Y_2SiO_5$:Tb, Ce is used. The mixing ratio of $CeMgAl_{11}O_{19}$:Tb to $Y_2SiO_5$:Tb, Ce is 0.4 to 0.6 on a molar basis.

Figure 16A:
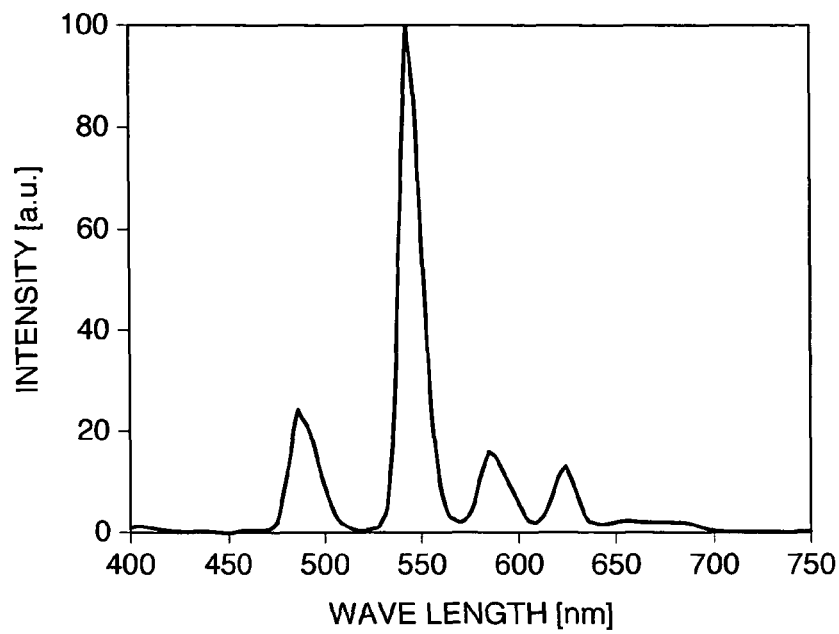
FIGS. 16(a) and (b) are the emission spectrum of a green phosphor mixture used in Example 6 and a color coordinate showing the color gamut of a liquid crystal display device formed by use of the green phosphor mixture, respectively.
Figure 16B:
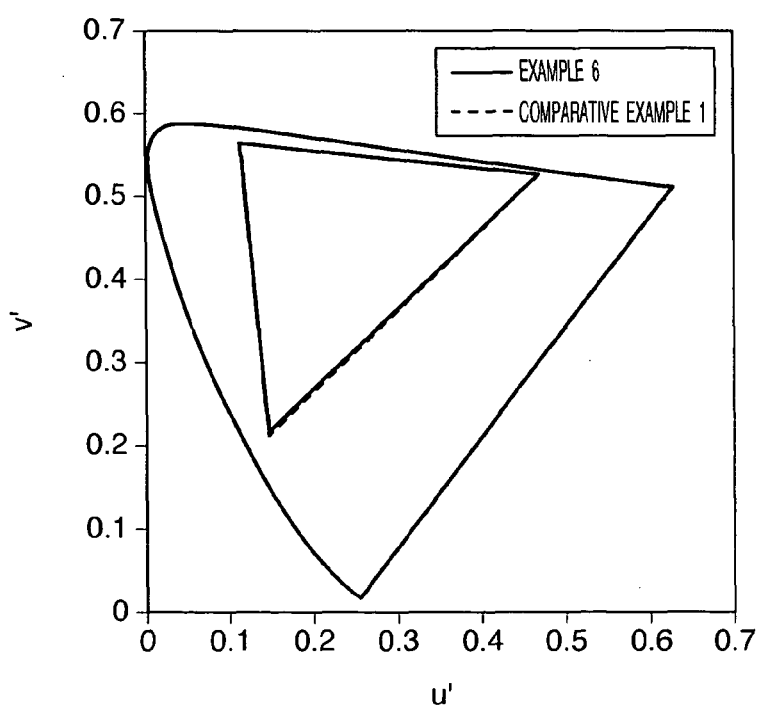

The emission spectrum of the green phosphor mixture is shown in FIG. 16($a$). The spectrum has substantially the same as that of $LaPO_4$:Tb, Ce conventionally used. The response characteristics are $\tau_{on}$=3.0 msec and $\tau_{off}$=3.8 msec, which are reduced to about 65% of a conventional $LaPO_4$:Tb, Ce.

The color gamut of the liquid crystal display device obtained in this Example is shown in FIG. 16($b$). The color gamut is substantially the same as that of Comparative Example 1 described later. The chromaticity change of a blue color is as extremely small as $\Delta u'$, $v'$=0.005, which is lower than a visual detection ability of a human ($\Delta u'$, $v'$<0.02).

The liquid crystal display device obtained in accordance with this Example is significantly improved in response characteristics of a green phosphor and has no substantial change in chromaticity. From this, it is demonstrated that three points of improvement of moving picture performance, suppression of chromaticity change, and reliability can be simultaneously attained.

EXAMPLE 7

This Example differs from Example 1 in the green phosphor mixture to be used; however, other constitutions are the same as in Example 1. In this Example, as the green phosphor mixture, a mixture of $Y_2SiO_5$:Tb, Ce and LaOCl:Tb, Ce is used. The mixing ratio of $Y_2SiO_5$:Tb, Ce to LaOCl:Tb, Ce is 0.5 to 0.5 on a molar basis.

Figure 17A:
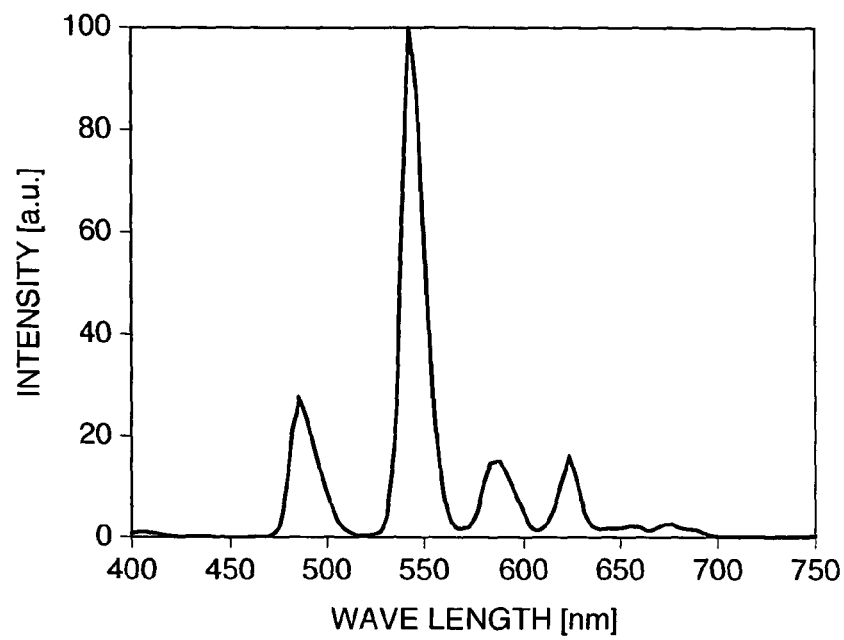
FIGS. 17(a) and (b) are the emission spectrum of a green phosphor mixture used in Example 7 and a color coordinate showing a color gamut of a liquid crystal display device formed by use of the green phosphor mixture, respectively.

The emission spectrum of the green phosphor mixture is shown in FIG. 17(a). The spectrum has substantially the same as that of $LaPO_4$:Tb, Ce conventionally used. The response characteristics are $\tau_{on}$=1.9 msec and $\tau_{off}$=2.5 msec, which are reduced to about 40% of a conventional $LaPO_4$:Tb, Ce.

Figure 17B:
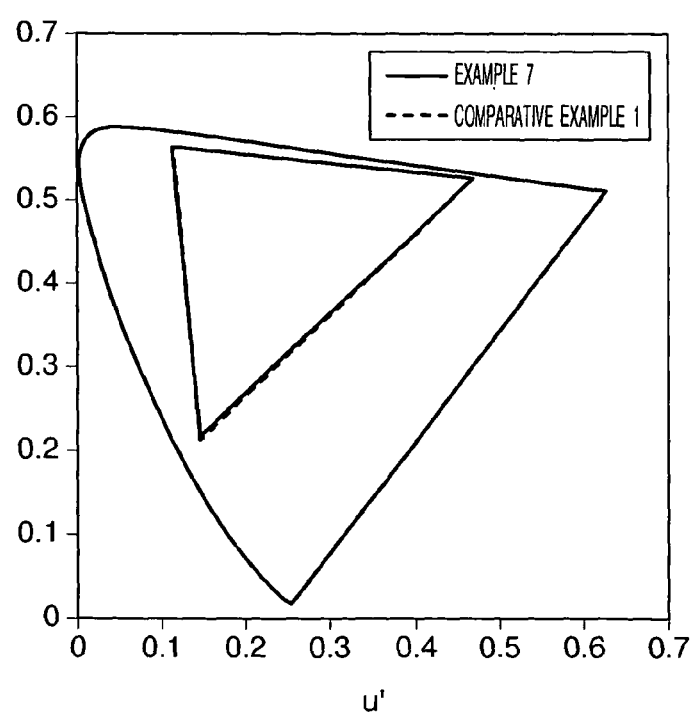

The color gamut of the liquid crystal display device obtained in this Example is shown in FIG. 17(b). The color gamut is substantially the same as that of Comparative Example 1 described later. The chromaticity change of a blue color is as extremely small as $\Delta u'$, $v'$=0.006, which is lower than a visual detection ability of a human ($\Delta u'$, $v'$<0.02).

The liquid crystal display device obtained in accordance with this Example is significantly improved in response characteristics of a green phosphor and has no substantial change in chromaticity. From this, it is demonstrated that three points of improvement of moving picture performance, suppression of chromaticity change, and reliability can be simultaneously attained.

EXAMPLE 8

This Example differs from Example 1 in the green phosphor to be used; however, other constitutions are the same as in Example 1. In this Example, the green phosphor is not a green phosphor mixture but $Y_2SiO_5$:Tb, Ce alone.

Figure 18A:
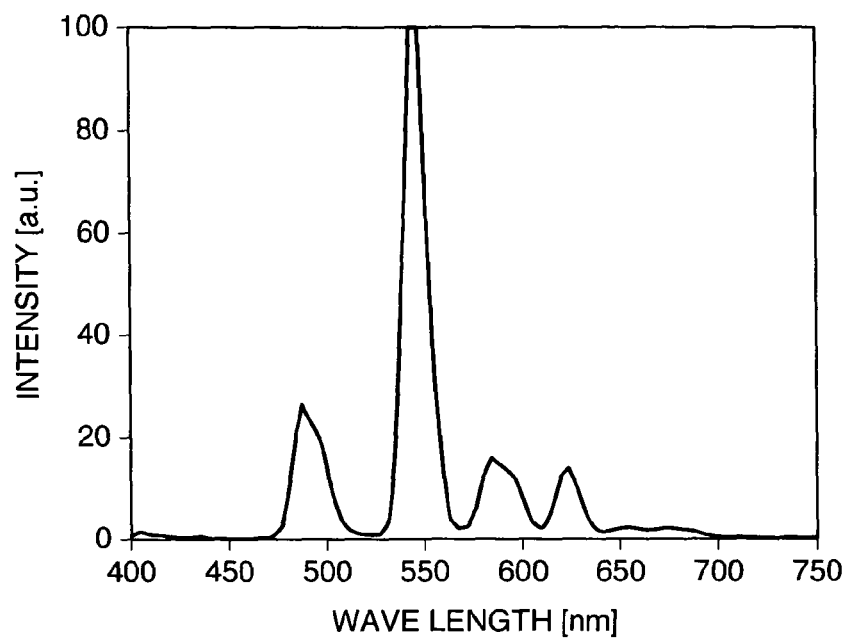
FIGS. 18(a) and (b) are the emission spectrum of a green phosphor used in Example 8 and a color coordinate showing the color gamut of a liquid crystal display device formed by use of the green phosphor, respectively.

The emission spectrum of the green phosphor is shown in FIG. 18(a). The spectrum has substantially the same as that of $LaPO_4$:Tb, Ce conventionally used. The response characteristics are $\tau_{on}$=2.4 msec and $\tau_{off}$=3.1 msec, which are reduced to about 50% of a conventional $LaPO_4$:Tb, Ce.

Figure 18B:
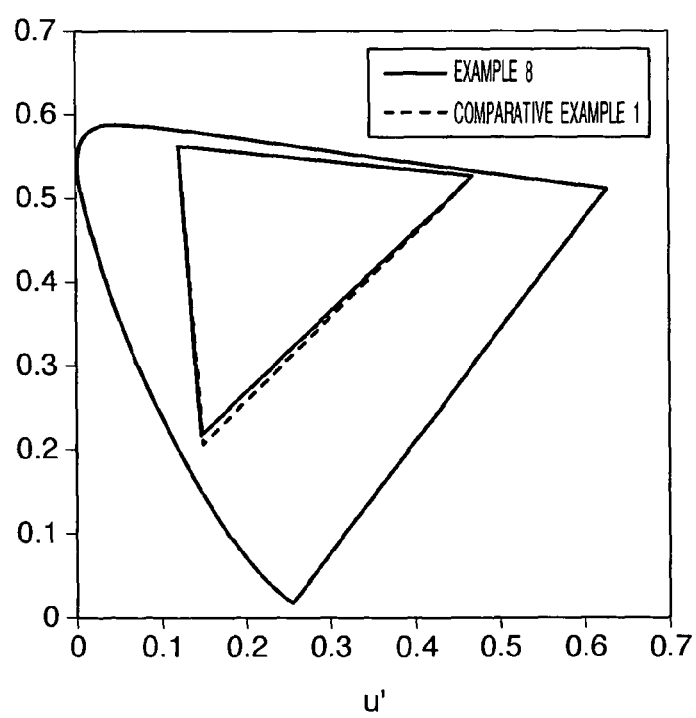

The color gamut of the liquid crystal display device obtained in this Example is shown in FIG. 18(b). The color gamut is substantially the same as that of Comparative Example 1 described later. The chromaticity change of a blue color is as extremely small as $\Delta u'$, $v'$=0.011, which is lower than a visual detection ability of a human ($\Delta u'$, $v'$<0.02).

The liquid crystal display device obtained in accordance with this Example is significantly improved in response characteristics of a green phosphor and has no substantial change in chromaticity. From this, it is demonstrated that three points of improvement of moving picture performance, suppression of chromaticity change, and reliability can be simultaneously attained.

EXAMPLE 9

This Example differs from Example 1 in the green phosphor to be used; however, other constitutions are the same as in Example 1. In this Example, the green phosphor is not a green phosphor mixture but LaOCl:Tb, Ce alone.

Figure 19A:
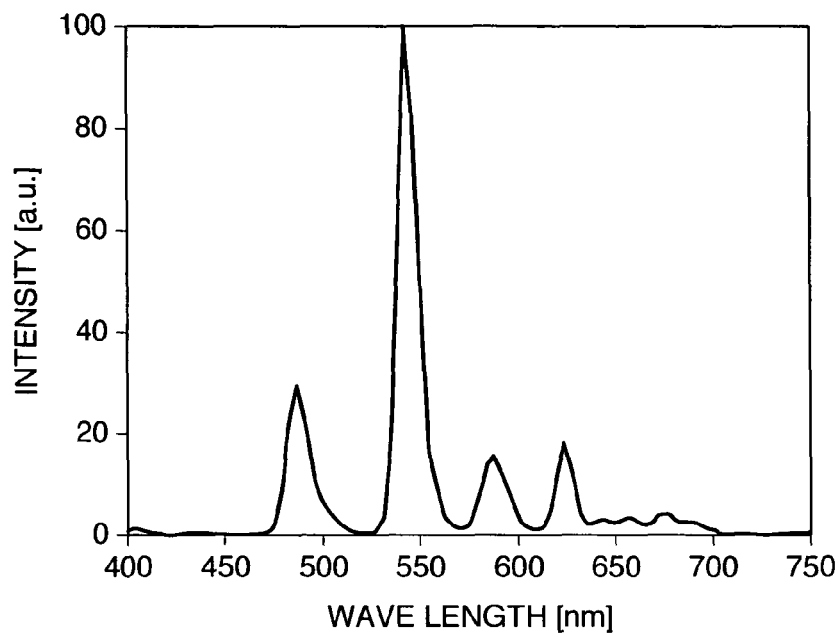
FIGS. 19(a) and (b) are the emission spectrum of a green phosphor used in Example 9 and a color coordinate showing the color gamut of a liquid crystal display device formed by use of the green phosphor, respectively.

The emission spectrum of the green phosphor is shown in FIG. 19(a). The spectrum has substantially the same as that of $LaPO_4$:Tb, Ce conventionally used. The response characteristics are $\tau_{on}$=1.3 msec and $\tau_{off}$=1.8 msec, which are reduced to about 30% of a conventional $LaPO_4$:Tb, Ce.

Figure 19B:
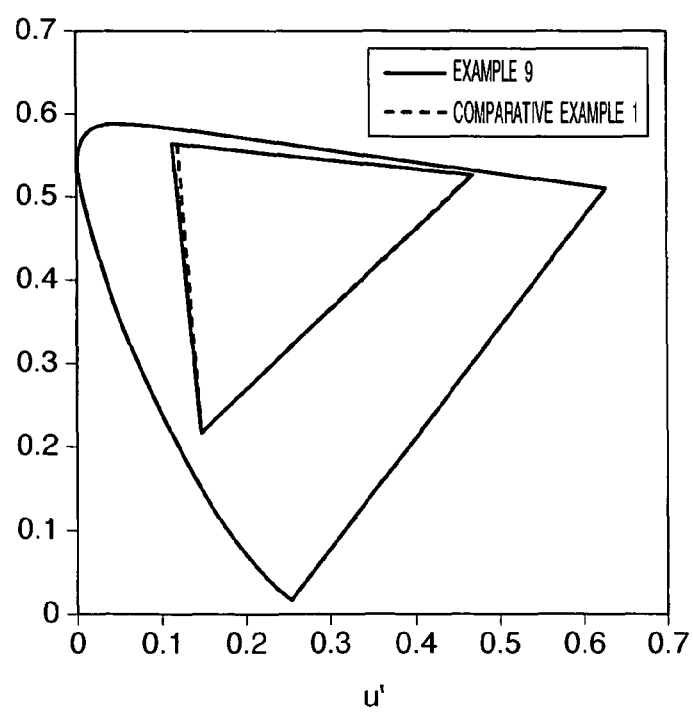

The color gamut of the liquid crystal display device obtained in this Example is shown in FIG. 19(b). The color gamut is substantially the same as that of Comparative Example 1 described later. The chromaticity change of a blue color is as extremely small as $\Delta u'$, $v'$=0.002, which is lower than a visual detection ability of a human ($\Delta u'$, $v'$<0.02).

The liquid crystal display device obtained in accordance with this Example is significantly improved in response characteristics of a green phosphor and has no substantial change in chromaticity. From this, it is demonstrated that three points of improvement of moving picture performance, suppression of chromaticity change, and reliability can be simultaneously attained.

EXAMPLE 10

This Example differs from Example 1 in the red phosphor to be used; however, other constitutions are the same as in Example 1. In this Example, a red phosphor mixture is used as the red phosphor. More specifically, a red phosphor mixture of $Y_2O_3$:Eu and (Y, Gd)(P, V)$O_4$:Eu is used. The mixing ratio of $Y_2O_3$:Eu to (Y, Gd)(P, V)$O_4$:Eu is 0.5 to 0.5. The green phosphor used in this Example is the same green phosphor mixture as used in Example 1. In this Example, it was found that the red phosphor (Y, Gd)(P, V)$O_4$:Eu has a higher response characteristics than that of a conventional $Y_2O_3$:Eu.

Figure 20A:
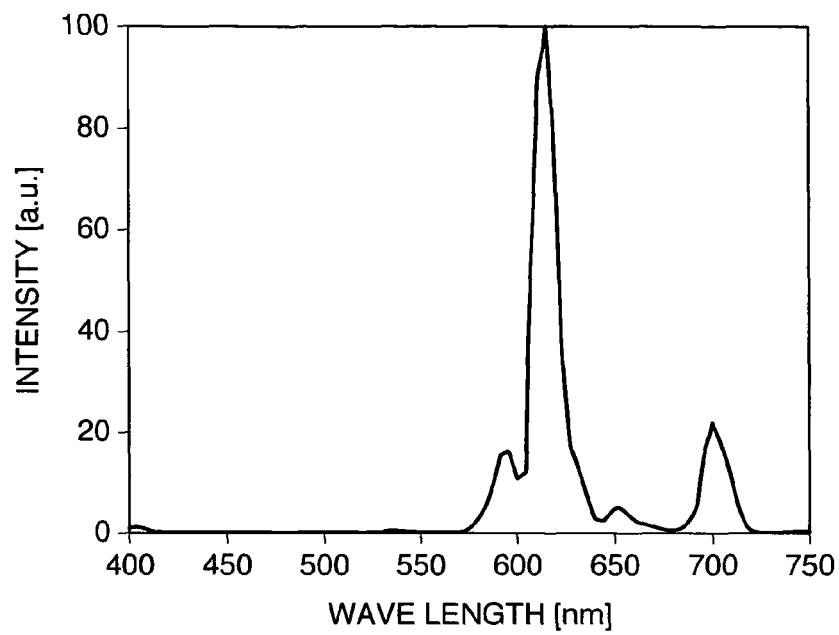
FIGS. 20(a) and (b) are the emission spectrum of a red phosphor mixture used in Example 10 and a color coordinate showing the color gamut of a liquid crystal display device formed by use of the red phosphor mixture, respectively.

The emission spectrum of the red phosphor mixture is shown in FIG. 20(a). The response characteristics are $\tau_{on}$=1.5 msec and $\tau_{off}$=1.5 msec, which are reduced to about 90% of a conventional $Y_2O_3$:Eu.

Figure 20B:
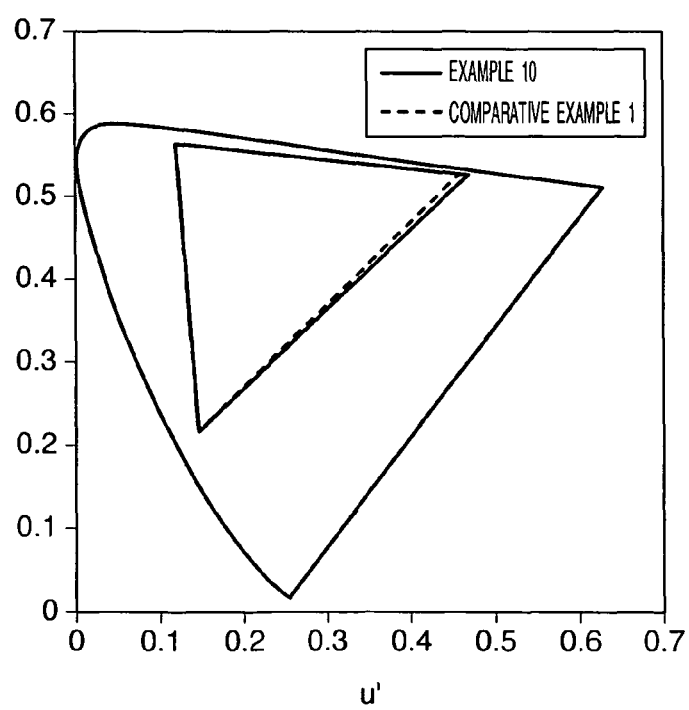

The color gamut of the liquid crystal display device obtained in this Example is shown in FIG. 20(b). The color gamut is substantially the same as that of Comparative Example 1 described later. The chromaticity change of a red color is as extremely small as $\Delta u'$, $v'$=0.009 and closer to the red chromaticity defined by the NTSC than that of conventional one. Furthermore, the blue chromaticity obtained by using a green phosphor mixture is lower than a visual detection ability of a human ($\Delta u'$, $v'$<0.02).

The liquid crystal display device obtained in accordance with this Example is significantly improved in response characteristics of red and green phosphors and has no substantial change in chromaticity. From this, it is demonstrated that three points of improvement of moving picture performance, suppression of chromaticity change, and reliability can be simultaneously attained.

EXAMPLE 11

This Example differs from Example 1 in the white light source to be used. A CCFL is used in Example 1; however, an LED emitting ultraviolet light and a white LED using three color-phosphors are used as a white light source.

The white LED has a structure shown in FIG. 3(c) and mainly formed of a semiconductor emitting device 15 and a phosphor 12. As the semiconductor emitting device, a chip of a gallium nitride (GaN) system is used which emits near ultraviolet light. Phosphors are excited by the near ultraviolet light and emit three types of visible light. As the phosphors, $Y_2O_2S$:Eu as a red phosphor, $LaPO_4$:Tb, Ce/$Y_2SiO_5$:Tb, Ce as a green phosphor mixture, and $BaMgAl_{10}O_{17}$ as a blue phosphor are used.

Figure 21:
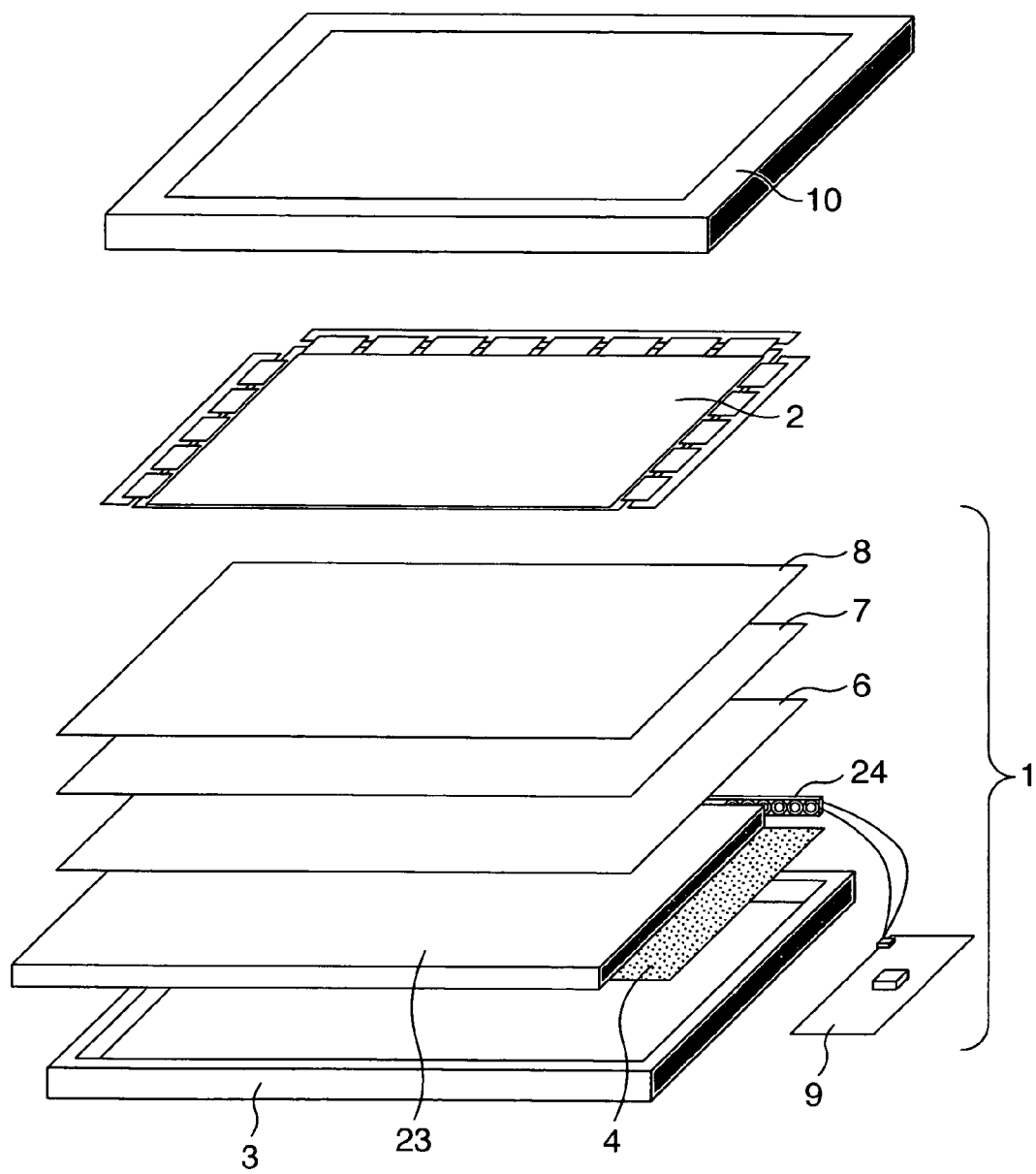
FIG. 21 is an exploded perspective view of a liquid crystal display device according to Example 11.

To use the white LED, the back light unit used in this Example differs from that of Example 1. The structure of the back light unit used in this Example is shown in FIG. 21. To explain more specifically, a white LED 24 is arranged at both sides of a panel. Light is guided by a light guide plate 23 toward the front surface. Light from the light guide plate passes through a diffusion sheet 6, a prism sheet 7 and a reflective polarizer 8 and enters a liquid crystal display panel 2. The incident light from the liquid crystal panel proceeds through the same route as in Example 1.

The color gamut of the liquid crystal display device obtained in this Example is substantially the same as that of Example 1 and also substantially the same as that of Comparative Example described later. The chromaticity change of a blue color is lower than a visual detection ability of a human ($\Delta u'$, $v'$<0.02). Since the green phosphor is the same as in Example 1, the emission spectrum is as shown in FIG. 1($a$) and the response characteristics are the same as in Example 1.

The liquid crystal display device obtained in accordance with this Example is significantly improved in response characteristics of a green phosphor and has no substantial change in chromaticity. From this, it is demonstrated that three points of improvement of moving picture performance, suppression of chromaticity change, and reliability can be simultaneously attained.

COMPARATIVE EXAMPLE 1

The comparative example shows a liquid crystal display device formed by conventional techniques and differs from Example 1 in the green phosphor to be used; however, other constitutions are the same as in Example 1. In this Example, the green phosphor is not a green phosphor mixture but $LaPO_4$:Tb, Ce alone. Furthermore, the red phosphor is not a red phosphor mixture but $Y_2O_3$:Eu alone. As a blue phosphor, $BaMgAl_{10}O_{17}$:Eu alone is used.

Figure 22A:
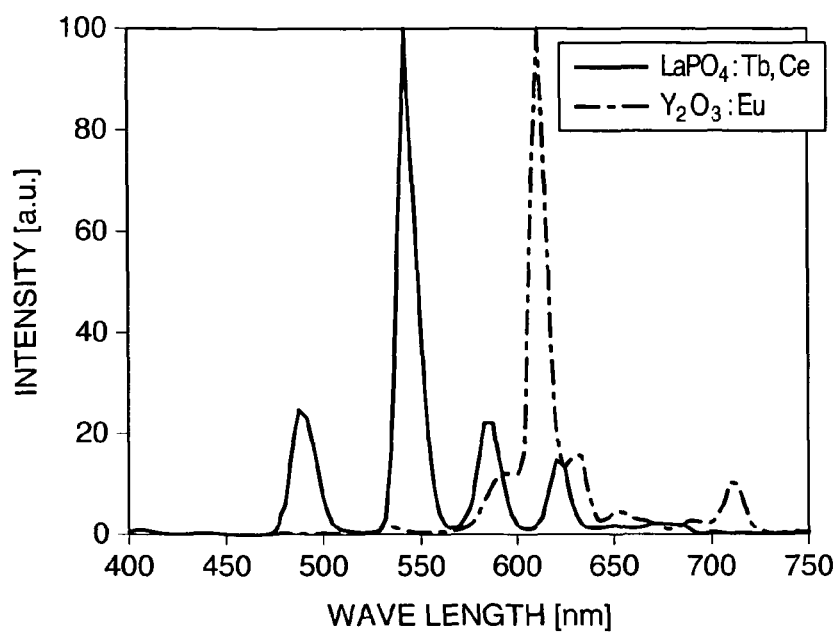
FIGS. 22(a) and (b) are the emission spectra of green and red phosphors used in Comparative Example 1 and a color coordinate showing the color gamuts of liquid crystal display devices formed by use of the green and red phosphors, respectively.
Figure 22B:
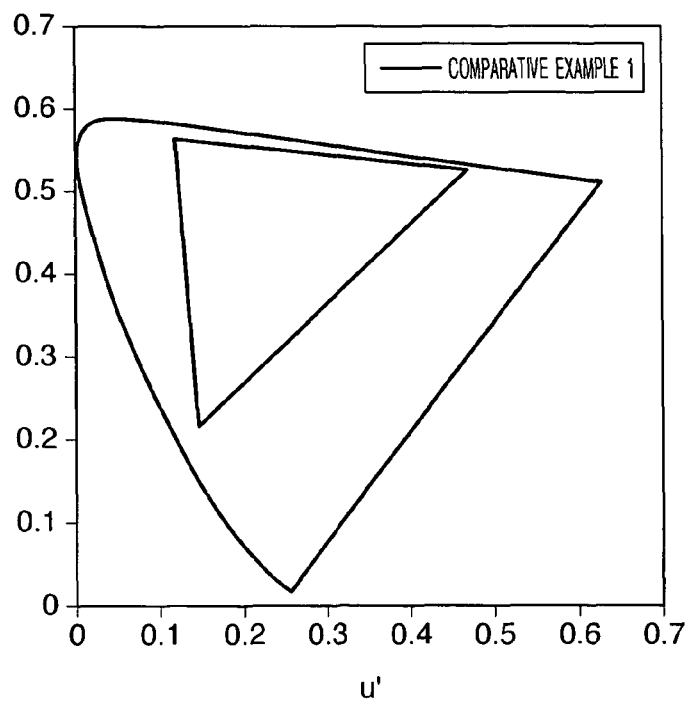

The emission spectra of the green and red phosphors are shown in FIG. 22($a$). The response characteristics of the green phosphor are $\tau_{on}$=4.8 msec and $\tau_{off}$=5.8 msec, and the response characteristics of the red phosphor are $\tau_{on}$=1.7 msec and $\tau_{off}$=1.7 msec. Furthermore, the color gamut of the liquid crystal display device obtained in this Example is shown in FIG. 22($b$).

COMPARATIVE EXAMPLE 2

This Comparative Example differs from Example 1 in the green phosphor mixture to be used; however, other constitutions are the same as in Example 1. In this Comparative Example, as the green phosphor mixture, a green phosphor mixture of $LaPO_4$:Tb, Ce and $SrAl_2O_4$:Eu is used. The mixing ratio of $LaPO_4$:Tb, Ce to $SrAl_2O_4$:Eu is 0.5 to 0.5 on a molar basis.

Figure 23A:
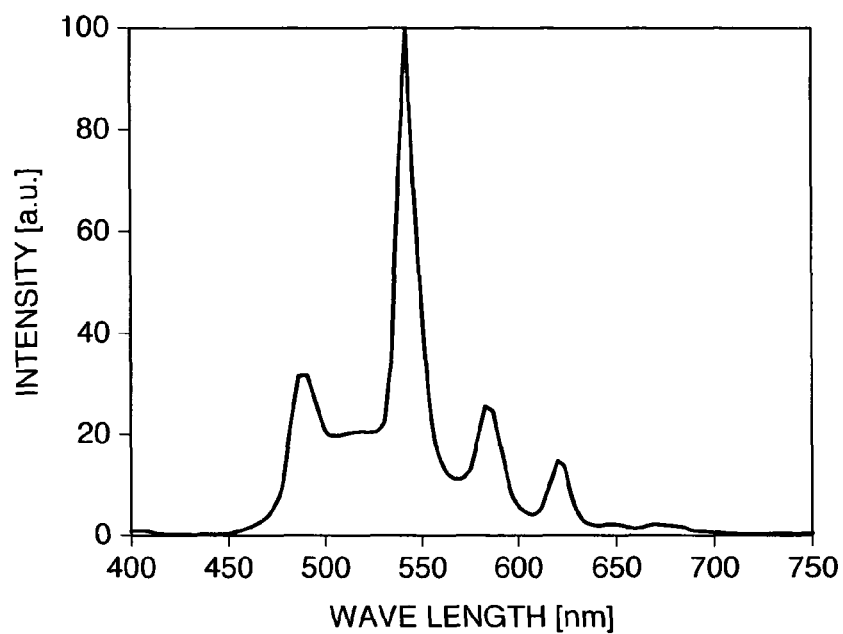
FIGS. 23(a) and (b) are the emission spectrum of a green phosphor mixture used in Example 2 and a color coordinate showing the color gamut of a liquid crystal display device formed by use of the green phosphor mixture, respectively.
Figure 23B:
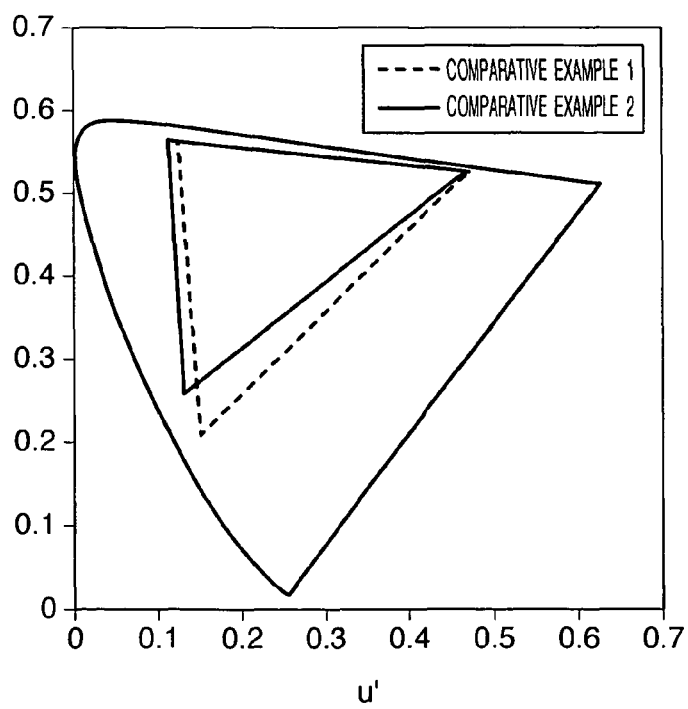

The emission spectrum of the green phosphor is shown in FIG. 23($a$). The spectrum significantly differs from that of $LaPO_4$:Tb, Ce conventionally used. In particular, the shape of the spectrum in the vicinity of a wavelength of 500 nm differs. The response characteristics are $\tau_{on}$=2.5 msec and $\tau_{off}$=3.0 msec, which are reduced to about 50% of a conventional $LaPO_4$:Tb, Ce.

The color gamut of the liquid crystal display device obtained in this Comparative Example is shown in FIG. 23($b$). The color gamut significantly differs from that of Comparative Example 1 described above. The chromaticity of a blue color is large in the value v, and the chromaticity change of a blue color is as extremely large as $\Delta u'$, $v'$=0.054, which is extremely larger than human visual sensitivity ($\Delta u'$, $v'$>0.02) and sufficient for a human to recognize difference in color.

The liquid crystal display device obtained in this Comparative Example is improved in response characteristics of a green phosphor; however significantly decreases in blue purity. From this, it is demonstrated that three points of improvement of moving picture performance, suppression of chromaticity change, and reliability cannot be attained simultaneously.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A liquid crystal display device comprising
a white light source having a blue phosphor, a green phosphor, and a red phosphor and having a light-on state and a light-off state in a single frame; and
a liquid crystal display panel which controls an amount of transmitted light from the white light source for each pixel and which has a color filter for allowing any of blue light, green light, and red light to be transmitted therethrough for each pixel,
wherein the green phosphor is a phosphor mixture prepared by mixing at least two types of green phosphors different in host type-composition, at least two type of green phosphors being a first green phosphor and a second green phosphor, respectively, with all of the green phosphors contained in the phosphor mixture having the same element as a luminescence center; a molar ratio of the first green phosphor: the second green phosphor is from 0.9:0.1 to 0.7:0.3,
wherein the first green phosphor has a high response time, a period of time required for a brightness for the first green phosphor to rise from 0% to 90% due to an electric power supply and a period of time required for the brightness of the first green phosphor to fall from 100% to 10% due to an electric power supply is less than 4 msec;
wherein the second green phosphor has a response time slower than the first green phosphor, a period of time required for a brightness of the second green phosphor to rise from 0% to 90% due to an electric power supply and a period of time required for the brightness of the second green phosphor to fall from 100% to 10% due to an electric power supply are at least 4 msec;
wherein when the phosphor mixture has the greatest brightness of 100%, both a period of time required for a brightness of the phosphor mixture to rise from 0% to 90% due to an electric power supply and a period of time required for the brightness of the phosphor mixture to fall from 100% to 10% due to an electric power supply are 4 msec or less.

2. The liquid crystal display device according to claim 1, wherein the green phosphor is the phosphor mixture, and the phosphors mixture have a luminescence center of terbium.

3. The liquid crystal display device according to claim 1, wherein the red phosphor is the phosphor mixture, and the phosphors used in the mixture have a luminescence center of europium.

4. A liquid crystal display device according to claim 1, wherein the red phosphor is a phosphor mixture composed of at least two phosphors having different material compositions, and the phosphors used in the mixture have a peak wavelength within a range of 615±15 nm.

5. A liquid crystal display device according to claim 1, wherein the blue phosphor is a phosphor mixture composed of at least two phosphors having different material compositions, and the phosphors used in the mixture have a peak wavelength within a range of 450±15 nm.

6. The liquid crystal display device according to claim 1, wherein the blue phosphor, the green phosphor and the red phosphor each have a 90% brightness rise time from a light-off state to a light-on state and a 10% brightness fall time from a light-on state to a light-off state of 3 msec or less, respectively.

7. The liquid crystal display device according to claim 1, wherein at least one of the phosphors forming the phosphor mixture has a host material of a silicate containing silicon and oxygen.

8. The liquid crystal display device according to claim 7, wherein the silicate is represented by a chemical formula $Ln_xSi_yO_z$ where Ln is La, Y, Gd or Ga.

9. The liquid crystal display device according to claim 8, wherein the silicate is represented by a chemical formula $Ln_2SiO_5$ or $Ln_2Si_2O_7$ where Ln is La, Y or Gd.

10. The liquid crystal display device according to claim 7, wherein the silicate is represented by a chemical formula $(Ln(I)_aLn(II)_{1-a})_xSi_yO_z$ where Ln(I) and Ln(II) are each La, Y, Gd or Ga.

11. The liquid crystal display device according to claim 10, wherein the silicate is represented by a chemical formula $(Ln(I)_aLn(II)_{1-a})_2SiO_5$ or $(Ln(I)_aLn(II)_{1-a})_2Si_2O_7$ where Ln(I) and Ln(II) are each La, Y, Gd or Ga.

12. The liquid crystal display device according to claim 7, wherein the silicate is represented by any of chemical formulas $Y_2SiO_5$, $(Y, Gd)_2SiO_5$, $(Y, La)_2SiO_5$, $La_2SiO_5$, and $Y_2Si_2O_7$.

13. The liquid crystal display device according to claim 1, wherein at least one of the phosphors forming the phosphor mixture has a host material of a halide compound containing oxygen and a halogen selected from F, Cl and Br.

14. The liquid crystal display device according to claim 13, wherein the halide is represented by a chemical formula LnOX where Ln is La, Y, Gd or Ga, and X is F, Cl or Br.

15. The liquid crystal display device according to claim 13, wherein the halide compound is represented by a chemical formula LaOCl.

16. The liquid crystal display device according to claim 1, wherein at least one of the phosphors forming the phosphor mixture has a host material of an oxide represented by a chemical formula $Ln_2O_3$ where Ln is La, Y or Gd.

17. The liquid crystal display device according to claim 16, wherein the oxide is represented by a chemical formula $Y_2O_3$.

18. The liquid crystal display device according to claim 1, wherein at least one of the phosphors forming the phosphor mixture has a host material of an aluminate containing aluminum and oxygen.

19. The liquid crystal display device according to claim 18, wherein the aluminate is represented by a chemical formula $Ln_xAl_yO_z$ where Ln is La, Y, Gd or Ga.

20. The liquid crystal display device according to claim 19, wherein the aluminate is represented by a chemical formula $Ln_3Al_5O_{12}$ where Ln is La, Y, Gd or Ga.

21. The liquid crystal display device according to claim 18, wherein the aluminate is represented by any of chemical formulas $Y_3Al_5O_{12}$, $Y_3(Al, Ga)_5O_{12}$, $Gd_3(Al, Ga)_5O_{12}$, and $(Y, Gd)_3(Al, Ga)_5O_{12}$.

22. The liquid crystal display device according to claim 1, wherein at least one of the phosphors forming the phosphor mixture has a luminescence center of terbium and a host material composition of $LaPO_4$.

23. The liquid crystal display device according to claim 1, wherein at least one of the phosphors forming the phosphor mixture has a luminescence center of terbium and a host material composition of $CeMgAl_{11}O_{19}$.

24. The liquid crystal display device according to claim 1, wherein at least one of the phosphors forming the phosphor mixture contains cerium as a sensitizer.

25. The liquid crystal display device according to claim 1, wherein at least one of the phosphors forming the phosphor mixture has a host material of a vanadate containing phosphorus, vanadium, and oxygen.

26. The liquid crystal display device according to claim 25, wherein the vanadate is represented by a chemical formula $Y_xGd_y(P_zV_{1-z})O_4$.

27. The liquid crystal display device according to claim 1, wherein at least one of the phosphors forming the phosphor mixture has a luminescence center of europium and a host material composition of $Y_2O_3$.

28. The liquid crystal display device according to claim 1, wherein the white light source is a cold cathode fluorescent lamp.

29. The liquid crystal display device according to claim 1, wherein the white light source is a hot cathode fluorescent lamp.

30. The liquid crystal display device according to claim 1, wherein the white light source is a white light emitting diode prepared by a light emitting diode emitting ultraviolet light in combination with the phosphors.

* * * * *